United States Patent [19]
Lenz

[11] Patent Number: 5,784,539
[45] Date of Patent: Jul. 21, 1998

[54] QUALITY DRIVEN EXPERT SYSTEM

[75] Inventor: Frederick P. Lenz, East Setauket, N.Y.

[73] Assignee: Client-Server-Networking Solutions, Inc., White Plains, N.Y.

[21] Appl. No.: 753,484

[22] Filed: Nov. 26, 1996

[51] Int. Cl.$^6$ ................................................ G06F 17/00
[52] U.S. Cl. ...................... 395/50; 395/917; 395/919
[58] Field of Search .......................... 395/50, 917, 919

[56] References Cited

U.S. PATENT DOCUMENTS

| | | | |
|---|---|---|---|
| 4,939,668 | 7/1990 | Brown et al. | 395/77 |
| 5,263,164 | 11/1993 | Kannady et al. | 395/651 |
| 5,539,862 | 7/1996 | Short et al. | 395/50 |
| 5,544,067 | 8/1996 | Rostoker | 364/489 |
| 5,557,775 | 9/1996 | Shedletsky | 395/500 |

OTHER PUBLICATIONS

Hruschka, "Towards an Object Oriented Method for System Architecture Design", IEEE, May 8, 1990.
Barker et al, "Expert Systems for Configuration at Digital: XCON and Beyond", Communications of the ACM, vol. 32, Mar. 31, 1989.
Author unknown, "Applications of AI Technology in Communication Networks", Expert Systems, Aug. 88, vol. 5, No. 3, pp. 248–251, Mar. 31, 1988.
Lusher, "AI and Communications Network Design", AI Expert, pp. 40–47, Aug. 31, 1990.
Roman, "Expert System Software for Telecommunications Application", IEEE, 1985, pp. 179–183, Dec. 31, 1985.
Davidson, Jack W. and Fraser, Christopher W., "Automatic Inference and Fast Interpretation of Peephole Optimization Rules", *Software—Practice and Experience*, vol. 17(11), pp. 801–812 Nov., 1987.
Gudwin, R.R., Gomide, F.A.C., Netto, M.L.A. and Magalhães "Knowledge Processing in Control Systems", IEEE Transactions on Knowledge and Data Engineering, vol. 8, No. 1, pp. 106–119, Feb. 1996.

Luger, G.F. and Stubblefield, W.A. "Rule–Based Expert Systems", Artificial Intelligence, Structures and Strategies for Complex Problem Solving, 2nd Edition, Chapter 8, pp. 308–320, 1993.

*Primary Examiner*—Tariq R. Hafiz
*Assistant Examiner*—James W. Myhre
*Attorney, Agent, or Firm*—Fenwick & West LLP

[57] ABSTRACT

A quality driven expert system maps answers input by a user in a user questionnaire into a set of qualities descriptive of a desired output entity. A library of output entities, such as network architectures is provided, each described by values for various ones of the qualities. The qualities derived by the expert system from the user's answers are matched against the qualities of the various output entities in the library to determine which entities match the specified qualities. A score for each output entity is determined by an associative matching algorithm as a function of the degree of match between each entity and the specified qualities, along with an explanation of the degree of match between each specified quality and the qualities of the output entity. A selected number of the highest scoring entities are returned to the user to further inspection and comparison. The expert system architecture may be applied in various application domains, one useful implementation of which is for the selection of network architectures for computer networks.

15 Claims, 9 Drawing Sheets

FIG. 5

QUALITY DRIVEN EXPERT SYSTEM

BACKGROUND

FIELD OF INVENTION

The present invention relates to expert systems and databases for evaluating user inputs to select entities from the database, and more particularly to expert systems and methods which derive quality information from user requirements and match the quality information with quality descriptions of entities in the database.

BACKGROUND OF INVENTION

Expert systems are commonly used today to perform a wide variety of tasks where a multitude of facts in a selected environment or application domain need to be analyzed to determine an appropriate response or diagnosis. Expert systems are particularly useful in application domains that are highly technical and typically require expert level knowledge and judgment in order to produce accurate and reliable assessments of facts and appropriate responses.

The typical expert system includes a knowledge base, an inference engine, and a user interface for obtaining case specific facts. The knowledge base encodes the "expert" knowledge of the application domain into a set of IF . . . THEN . . . ELSE statements (or rules) and fact statements. All knowledge about the domain is typically encoded through these rules and facts. The inference engine applies the case specific facts to the knowledge base rules and facts to derive a final set of facts or conclusions about the case. For example, a medical diagnosis expert system would take as case specific facts various symptoms and lab results of a patient, apply these facts to various diagnostic rules, and output a conclusion about what illness the patient has.

This conventional expert system architecture has a number of drawbacks which have been well documented. One particular problem is that because all of the knowledge is encoded in the rules of the knowledge base, modification of such rules is necessary in order to add new knowledge to the system. For example, to add a new disease to a conventional medical expert to system, a programmer must write new IF . . . THEN rules which encode the diagnosis procedure for this disease, create new types of facts necessary to capture the information such new rules require, and typically modify the user interface to ask the appropriate questions to capture the new facts. This makes the expert system brittle, because it cannot identify new patterns or outputs which have not been encoded into the knowledge base. In addition, it makes modification of the expert system difficult due to the complexity of both determining what the new rules should be and programming them into the system, along with making all of the other changes necessary to incorporate the new information.

A more general way of expressing this conventional design of expert systems is to say that they directly map a set of inputs—the case facts—to a set of outputs—conclusions, diagnosis—through a knowledge base of rules and other facts. Because the mapping is direct, and the mapping is based entirely on the knowledge base rules, and modification of the knowledge base is a necessary condition to alter the outputs for any given set of inputs.

One area of technical complexity suitable for expert systems generally is the design and development of computer networks. Traditionally, the design and installation of such networks has been left to a select cadre of skilled management information systems professionals who manually analyze the needs and requirements of a client, such as corporation or business, and design a computer network to meet such needs. MIS professionals typically rely on years of training, along with experience gained from previous installations, to know which network architectures are suitable for various user needs and requirements. Each network designer typically applies her own heuristics and judgments to both identify the client's requirements and then translate those requirements into the elements of a network architecture a and a project plan for implementing the network.

Expert systems have been previously designed for selection of computer network architectures. Conventional in design, such expert systems encode specific rules to determine which components of a network architecture are indicated by the specific requirements input by a user. For example, a conventional expert system in this application domain may take the facts of the required number of network users, the budget amounts, the geographic extent of the network, and using conventionally encoded rules, map those inputs directly to a specific network architecture. If there is a desire to add new network architectures to the expert system, new rules must be encoded in the knowledge base to represent the features and elements of such new architectures. Again, this process is time consuming and expensive, and the resulting expert system is relatively inflexible, particularly for unskilled end users.

The need to update the knowledge base of an expert system is particularly pressing in application domains such as computer network design. First, the variety of desirable network architectures is constantly evolving as new communication technologies are brought to market. Second, network designers typically rely on their experience and success with previous network architectures when designing new ones, and desire to capture such information in design tools that they use. A conventional expert system would be cumbersome and inefficient in this application domain, having to be repeatedly updated in order to accommodate both the latest technology information, and individual users' experiences and preferred designs. Since most network designers are not expert system programmers, they must use the services of such a programmer to translate new knowledge and information into the rules and other elements of the to expert system program.

Another design problem of conventional expert systems is the manner in which they produce output facts from a given set of input facts. Conventionally, expert systems output a set of facts, such as a diagnosis to a given set of inputs. Typically, expert systems do not let the user weight or prioritize the input facts in order to influence the selection of outputs. At best, expert systems use confidence measures encoded into the rules in order to accommodate incomplete or uncertain input facts. These confidence measures are predefined by an expert and are typically not subject to user modification during the analysis of an individual set of input facts. Thus, confidence measures merely describe the uncertainty of the causal relationship between the input facts and the outputs. This problem of confidence measures again stems from the fact that the expert system relies on mapping directly from the input space to the output space using the knowledge base, with the confidence measures typically used to augment existing knowledge base rules (indicating the confidence of the rule upon firing). Confidence measures do not therefore provide the user with an indication of the quality of the output relative to the inputs. Nor do confidence measures allow the user to understand the relative significance or influence of different aspects of the input facts on the resulting outputs.

Accordingly, it is desirable to provide a new architectures for expert systems that enables the selection of outputs through an indirect mechanism expressive of the qualities of the outputs relative to the input facts. A desirable expert system should be easily modifiable to accommodate new information about available outputs without significant computer programming. A desirable implementation of such an expert system is for the selection of network architectures in response to qualities derived from a user's requirements, along with the ability to easily update the expert system to incorporate new network architectures and designs.

SUMMARY OF THE INVENTION

The present invention overcomes the problems of conventional expert systems by providing a new type of expert system architecture that separates the mapping of the input space of case specific facts from the determination of the output space by interposing an intermediate quality space, and limiting the expert system to operate just in the quality space.

Qualities are used to describe the features of entities in an output space. For example, various network architectures may each be described by a set of qualities such as their size, type, cost, and performance. Qualities are defined by experts for some number of different entities in the output space. The expert system encodes a set of rules that map a given set of case specific facts input by the user into a set of case specific, required qualities, rather than directly onto one or more of the entities of the output space. Instead, an associative matching algorithm is then used to match the required qualities output from the expert system with the defined qualities of the output space entities. The associative matching algorithm provides for measuring the degree to which the qualities associated with the entities satisfy the required qualities derived from the user's inputs. In this manner the system provides a range of potential candidate outputs ranked in order of the degree to which the entities satisfy the required qualities.

One of the benefits of the quality driven expert system architecture is the ability to easily update the system to incorporate new output entities available for evaluation and selection. Instead of having to encode new rules in a knowledge base and update the user interface to capture new facts, the user adds a new entity to the system by defining its qualities in the existing quality space. These qualities are stated in the application domain, such as the qualities applicable to network architectures. An expert in the application domain may easily add new entities to the system, by describing these entities by they applicable qualities; no changes to the expert system rules or user interface are needed. This process is considerably easier than conventional expert systems that require either the expert or a knowledge engineer to program new rules into the knowledge base to capture the new entities, and devise new questions to capture the facts important to such entities. In the present invention the associative matching algorithm automatically considers and evaluate these new candidates when matching the qualities derived from the user with the output entities.

One embodiment of the present invention is an expert system for selecting a network architecture for a computer network. In this embodiment, the output space entities are a set of network architectures. Each network architecture is completely described by a set of qualities, such as the network type, processing loads, latency levels, and other features. The qualities are preferably assigned by experts familiar with the features, advantages, and disadvantages of various types of computer network architectures. The system is inherently flexible and extensible since the user can add new network architectures by specifying their qualities. The network architectures preferably include additional descriptive information, such as network diagrams, explanations of the features and benefits, advantages and disadvantages and the like.

The system includes a user questionnaire interface which presents a series of questions to the user to capture various facts about the user's needs and requirements. These questions need not be directly related to individual qualities of the network since these tend to be technical features of which users may have no knowledge. Rather, the questions are intended to capture the high level needs of the user. The user provides answers to these questions, the answers forming the set of case specific facts. In one embodiment, the user questionnaire interface further allows the user to prioritize various requirements, thereby reflecting which issues or needs have priority for the user. This allows the requirements to reflect the user's priorities when there are trade-offs between requirements, such as between cost and performance.

The system includes an expert system having a knowledge base of rules which maps the user's answers into the quality space to derive a set of required qualities for the network architecture. The priority assignments are used by the expert system to derive weights for the required qualities; these weights will then influence which network architectures satisfy the user's requirements.

The system further includes an associative matching algorithm that compares the required qualities with the qualities defined for various ones of the network architectures to produce a set of selected network architectures which satisfy the user's requirements to various degrees. The associative matching algorithm takes into account the weights assigned to the required qualities as derived from the user's answers. The result set of selected architectures is ranked in order of the degree to which their network qualities satisify the required qualities. The associative matching algorithm also produces for each selected network architecture an explanation describing the selection of each architecture, and particularly the degree of closeness between each required quality and the qualities of the network architecture.

The qualities are preferably constructed so that they are orthogonal, meaning that the qualities are independent of each other. Orthogonal qualities can be combined in almost any way with each other and will be logically consistent. The qualities also preferably form a minimal set, meaning that all of the factors which affect selection of an output entity, such as a network architecture for a computer system, are represented using as few qualities as possible.

Qualities are also preferably hierarchical in the sense that a high-level quality is defined by a set of more detailed qualities. In the case of hierarchical qualities, independence or orthogonality means that each branch of the hierarchical tree is independent of any other branch. Qualities are grouped into a set of logically-related categories, such as cost, risk, performance, and weights may be adjusted for individual qualities or categories of qualities.

For each quality, there is a value of the quality. Qualities also have types, including "symbol" qualities, "level" qualities, and "parent" qualities, which define the types of values for the quality. Symbol qualities are used to define qualities for which discrete symbolic values are used. For example, a geographic quality for a network is a symbol quality since the values of the quality are symbolic tokens such as "WAN," "MAN," and "LAN." Level qualities have numeric values, such as the number of nodes for a network.

Parent qualities are hierarchical qualities that are defined by lower level child qualities. Each network architecture is defined by the values assigned to the various qualities. The expert system determines from the user's input facts the required qualities (as not all qualities may be required) and their values.

In the preferred embodiment, the associative matching algorithm compares the values of the required qualities with the values of the qualities for selected ones of the network architectures. Generally, the associative matching algorithm determines for each required quality, whether the quality value of the required quality is satisfied by the quality value of corresponding quality of a network architecture. For each required quality, the associative matching algorithm produces a match score. Where weighted qualities are used, the match score is preferably a function of the weight of the required quality; this adjusts the match scores of individual required qualities by the priority or importance attributed to the quality by the user. One way of implementing weighted match scores is to set the match score equal to the quality weight of the required quality when the quality of the network architecture satisfies the required quality.

The match scores for all of the required qualities are totaled to define an architecture score for the network architecture. The network architectures are then ranked by their architecture scores. The user may then select the best fitting network architectures for review of their descriptions, diagrams, and the like. It should be understood that the required qualities describe the ideal qualities of an output entity; one of the powerful features of the associative matching algorithm is the ability to select entities which do not have all of the required qualities, but rather some variance therefrom. The associative matching algorithm also provides for each network architecture a selection explanation with an indication of the degree to which the network architecture satisified each required quality.

In one embodiment, the associative matching algorithm uses fuzzy logic to determine the degree of match between the value of required quality and the value of the quality for a network architecture. More particularly, fuzzy logic applies the weight associated with a quality to the difference between the required value and the network's quality value, to produce a weighted match score for that quality.

BRIEF DESCRIPTION OF THE DRAWINGS

FIG. 5 is an illustration of the user interface for assigning qualities to a network architecture.

DETAILED DESCRIPTION OF THE PREFERRED EMBODIMENT

System Overview

Figure 1:
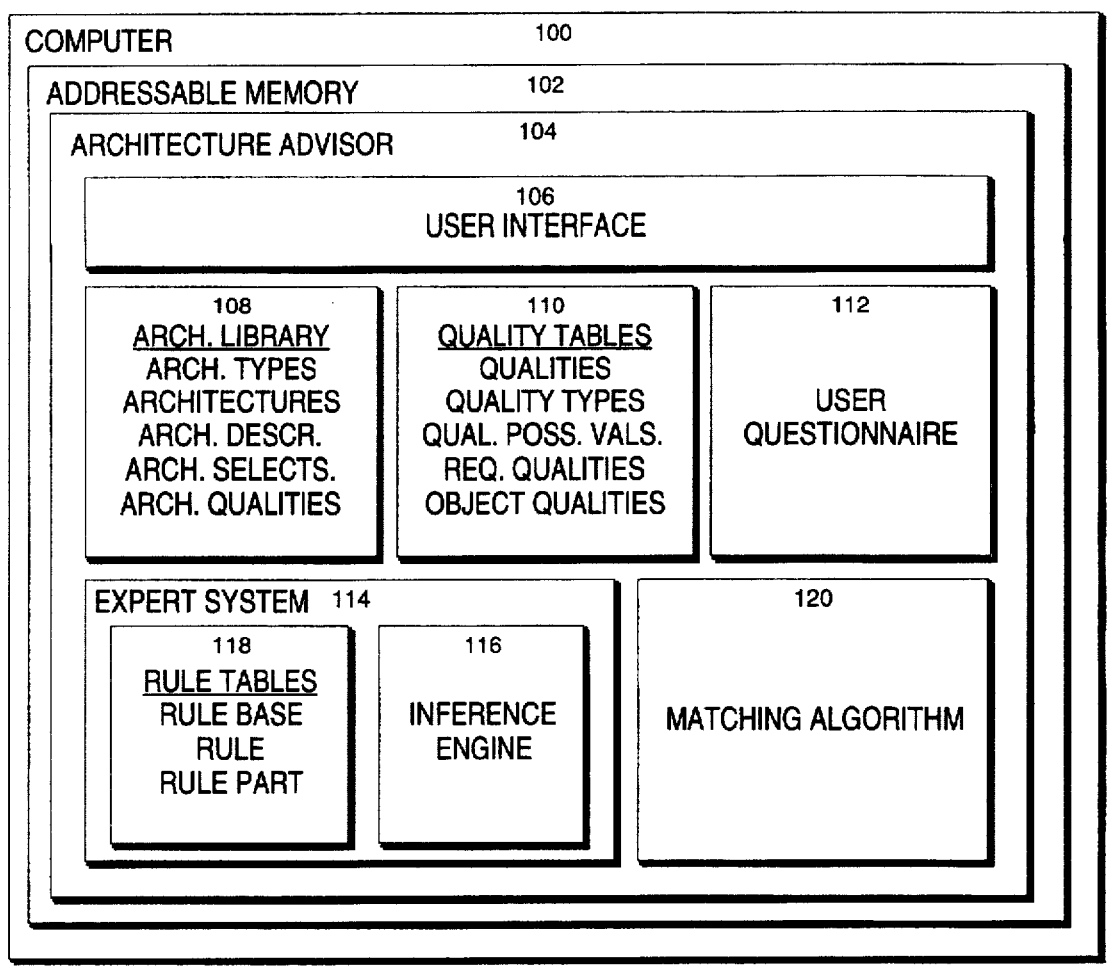
FIG. 1 is an illustration of a computer system providing a hardware environment for the present invention.

Referring now to FIG. 1 there is a shown an illustration of a suitable computer system configured to provide the quality driven expert system and associative matching algorithm of the present invention.

The present invention may be implemented on a conventional computer 100 including a processor, addressable memory 102, storage devices, mouse, keyboard, and display. The computer 100 executes a conventional operating system, such as Microsoft Corp.'s Windows 95™, or Windows NT™.

In an embodiment of the present invention there is stored in the addressable memory 102 an architecture advisor 104, which is one type of software product implementing the features of the present invention to provide an expert system and associative matching algorithm, in this embodiment for selecting network architectures for computer networks. The present invention is not limited to the application domain of computer networks, but may be disposed in any application domain for which the set of output entities can be defined by a finite number of qualities, and for which rules or heuristics may be defined for deriving such qualities from a set of input facts.

In the architecture advisor 104 embodiment there is included an architecture library 108, a set of quality tables 110, a user questionnaire 112, an expert system 114, and an associative matching algorithm 120.

The architecture library 108 is a database of network architecture descriptions, including for each network architecture a self describing set of qualities and values pertaining to the architecture. The network architectures form the output entities for this embodiment of the present invention. The architecture advisor 104 assists the user in selecting one of the network architectures for use in the design and implementation of a computer network, including client server networks. The architecture library 108 includes data defining the types of network architectures, the identification of network architectures, the qualities associated with each network architecture, and the network architectures selected by the architecture advisor 104.

The quality tables 110 provide the definition of the quality space by which the network architectures are described. The quality tables 110 include descriptions of the types of qualities, the individual qualities themselves including their descriptions, the possible values for various types of qualities, the required qualities resulting from a user's input requirements, and a set of object qualities which describe the qualities of specific features of individual network architectures.

The user questionnaire 112 presents a set of questions to the user through the user interface 106 to elicit answers defining the user's requirements. In the embodiment of the architecture advisor 104, the user questionnaire 112 includes questions regarding the needs and requirements of a user for a computer network installation. The answers provided by the user are encoded into a list of facts which is input to the expert system 114. The answers may also include information indicating the user's priorities or tradeoffs in deciding which requirements are more significant.

The expert system 114 includes a set of rule tables 118 and an inference engine 116. The rule tables 118 define the rules that map the user's answers onto the qualities to produce a set of required qualities, such as the required qualities for a network architecture. Some of the required qualities are weighted according to either default weights or the weights derived from the user's answers. The rule tables 118 include a rule base table listing distinct groups of rules defining distinct application domain, individual rules which are comprised of rule parts to define the antecedent and consequent elements of rules. The inference engine 116 is a conventional forward chaining type and operates upon the various rules and the facts input by the user.

The architecture library 108, quality tables 110, and rule tables 118 are preferably implemented in a relational database to allow for ease of association between these elements.

Finally, the present invention includes an associative matching to algorithm 120. This executable module takes as inputs the required qualities produced by the expert system 114, and the network architectures described by their qualities, compares them to produce an architecture score, and selects the network architectures that best fit the required qualities based on their ranked scores. The associative matching algorithm 120 generally determines is for each required quality, whether a quality value of the required quality is satisfied by a quality value of a corresponding quality of a network architecture. The associative matching algorithm 120 determines an architecture score as a function of whether such qualities are satisfied.

One embodiment of the associative algorithm 120 implements a fuzzy logic analysis that weights the difference between the required quality values and the network architecture quality values by the weights of the required qualities, to determine a ranked list of the network architectures that best match the required qualities.

The user interface 106 is used to display descriptions of the network architectures to the user, to display the questionnaire data and receive the user's answers, and to output the list of network architectures from the associative matching algorithm.

The architecture advisor 104, or any other domain specific software product embodiment of the present invention, or any variation thereof, may be stored on CD-ROM, diskette, or any other computer readable memory or media, and provided to the computer system 100 for installation and execution thereon.

Operational Overview

Figure 2:
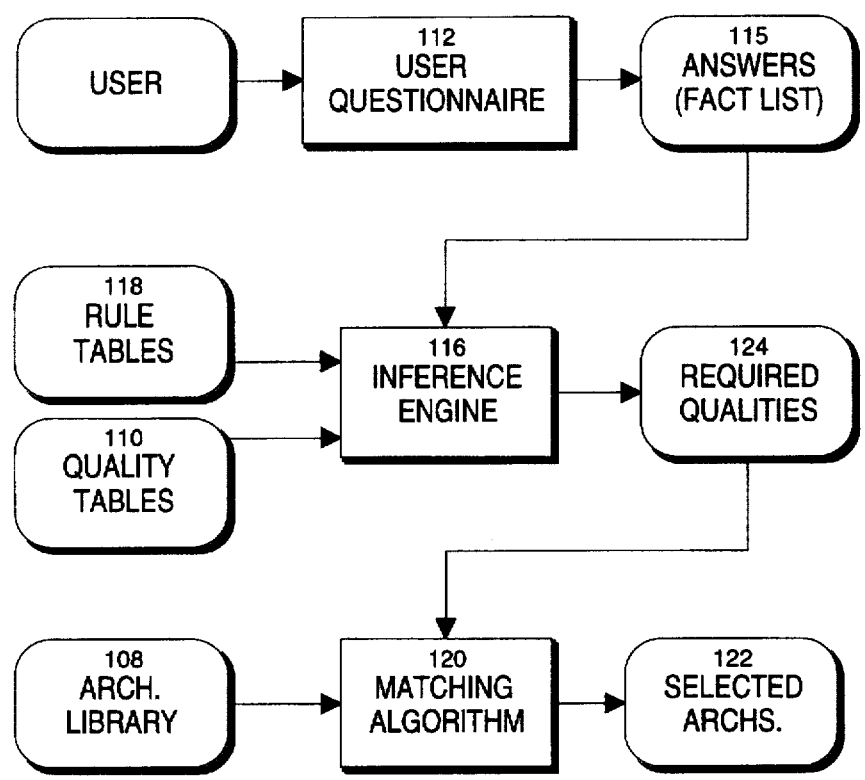
FIG. 2 is a process model of the overall operation of the present invention.

Referring now to FIG. 2 there is shown a process model of the overall operation of the architecture advisor 104 embodiment of the present invention. Other types of embodiments operate in a similar fashion given the architecture of the present invention.

The user questionnaire 112 is presented to the user through the user interface 106. The user questionnaire 112 includes a series of questions to which the user responds with a set of answers 115. The questions may call for selecting one or more of multiple options, a yes/no response, numeric, or symbolic inputs. The answers 115 describe the user's needs and requirements for a computer network. In the preferred embodiment the answers 115 are stored as a fact list of (attribute, value) pairs, the attributes being a token representing a fact and the value being representative of the answer provided by the user. In one embodiment, the answers 115 may include user assigned orderings or weights which reflect the priority or importance of various requirements relative to other requirements. While the preferred embodiment of the user questionnaire 112 provides a sequenced presentation of questions, other embodiments may be implemented, such as a spreadsheet or form where all the questions are presented at the same time.

The answers 115 are input to the inference engine 116 of the expert system 114. The expert system 114 derives a set of required qualities 124 from the questionnaire answers 115. The questions in the user questionnaire 112 are formulated to be clear and simple for the user to understand, but are not in the best form for selecting a network architecture. The qualities represent the user's requirements in a technical and detail form thus are in a form that is not easily understood by the user. Since there is a complicated relationship between the questionnaire answers 115 and the qualities 124, the expert system 114 is used to map the answers 115 into the quality space.

The inference engine 116 applies the rules of the rule tables 118 and qualities 110 to the answers 115. The rules 118 defines the relationships between the facts of the answers 115 and various qualities defining the network architectures. From the various facts in the answers 115, the expert system 114 determines the appropriate required quality 124, the value of the required quality, and the weight (if any). Not every possible quality in the set of qualities 110 has an instance in the required qualities; the values associated is with the required qualities may be the actual values specified by the user in the answers 115, or may be value determined by the expert system 114 according to the rules 118. The required qualities 124 represent the qualities of an ideal network architecture.

Once the required qualities 124 are determined they are provided to the associative matching algorithm 120, along with the architecture qualities defined in the architecture library 108. The associative matching algorithm 120 takes each of the required qualities and compares it with the qualities defined for selected ones of the network architectures in the architecture library 108 to determine how well the quality of the network architecture satisfies the required quality. The associative matching algorithm 120 may operate over the entire set of network architectures in the architecture library 108, comparing the qualities of each one with the required qualities 124, or it may operate on a limited subset of the network architectures, using optimization methods to narrow the search space. It should be noted that in most instances, none of the network architectures will fully satisfy all the required qualities, but some architectures will satisfy the qualities better than others. Thus, the associative matching algorithm 120 identifies that network architectures that best meet the user's requirements.

In either implementation, the associative matching algorithm 120 outputs for a network architecture an architecture score that describes the overall match between the network architecture and the required qualities 124 on a predefined scale (e.g. 0 to 100, 100 being a perfect match). The architecture score is computed by comparing the quality value of each required quality with the quality value of the corresponding quality of the architecture. One scoring method is to increase the architecture score by the weight of the required quality if the quality value of the corresponding quality of the network architecture satisifies the required quality value of the required quality; or decrease it by this amount if the quality value does not satisfy the required quality value.

Figure 9:
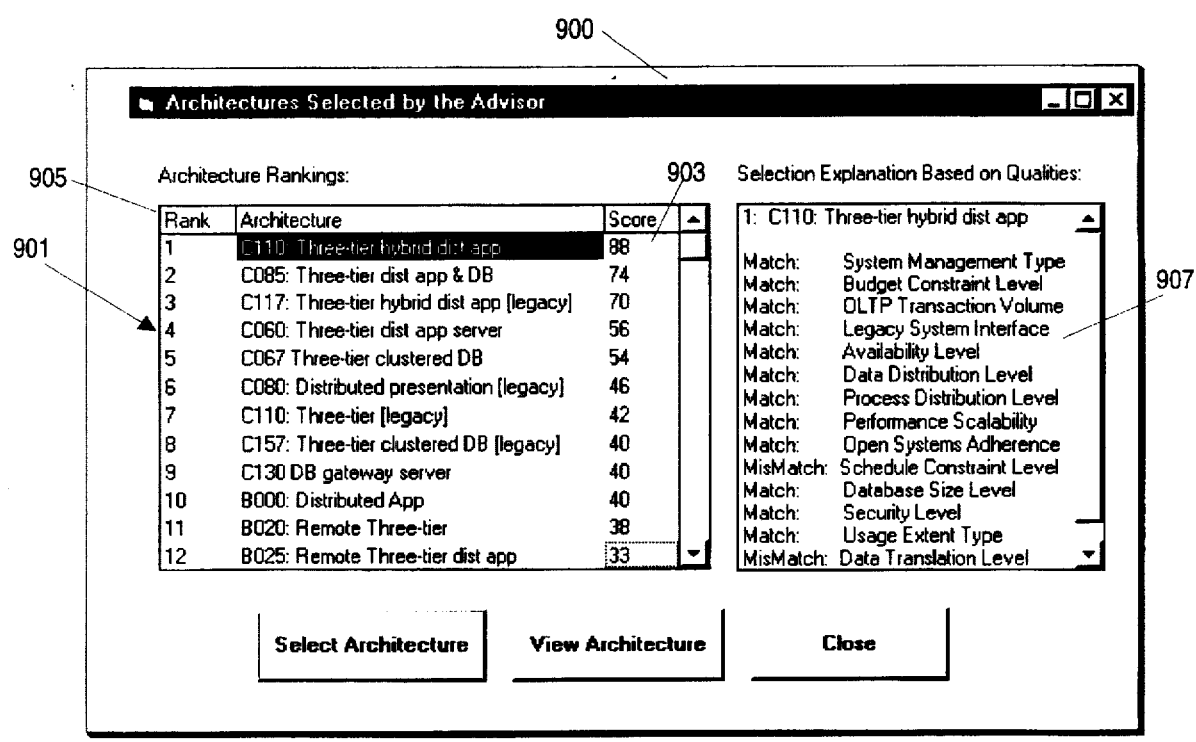
FIG. 9 is an illustration of the user interface for reviewing the selected network architectures output by the associative matching algorithm.

The associative matching algorithm 120 ranks the network architectures by their architecture scores, and displays the list of a selected number of highest ranking network architectures to the user through the user interface 106. In one embodiment, for each selected network architecture there is a selection explanation that describes the reasons for the architecture score in terms of the individual matches between the required qualities and the networks qualities. FIG. 9 illustrates one example of the output of the associative matching algorithm 120 showing the architecture score 903 and selection explanation 907 for a selected network architecture. The user may obtain the detailed description information of any network architecture from the architecture library 108 to understand the specific design details and configuration of the network architecture, including its features, advantages, and disadvantages. The user may then select one of these network architectures to apply to computer network, either as described or in modified form.

The present invention has been described here with respect to an implementation for advising on the selection of computer network architectures. The following description provides further details of this one implementation. This implementation is but one application of the present invention, which may be implemented in any variety of application domains.

Architecture Library

The architecture library 108 stores a set of network architectures in a database format. Each network architecture is described in detail to assist in the user's understand of the structure, features, benefits, and disadvantages of the network architecture. The network architectures are preferably chosen by industry experts and represent a large set of the known good architectures for implementing a wide variety of client/server systems. In the preferred embodiment, each network architecture includes a textual description, along with its advantages and disadvantages. In addition, each network architecture consists of a diagram showing the logical components of a client server/system, including the client computers, the server computers, the LAN networks, WAN networks, and the like. These parts of the architecture library 108 are for the user's benefit, and are not used by the architecture advisor 104 to select one or more network architectures.

The descriptions of the network architectures are logical rather than physical. They describe logical models of successful client/server computer networks and architectures, and include categories of communication protocols such as 10BaseT, 100BaseT, FDDI, Token Ring, and the like. The architectures exemplify different levels of redundancy, network management, performance, and so forth, but preferably do not contain detailed information about specific hardware brands or vendors, hardware specifications such as computer memory requirements, network interface cards, or the like, though such details may be implemented if desired.

Figure 3:
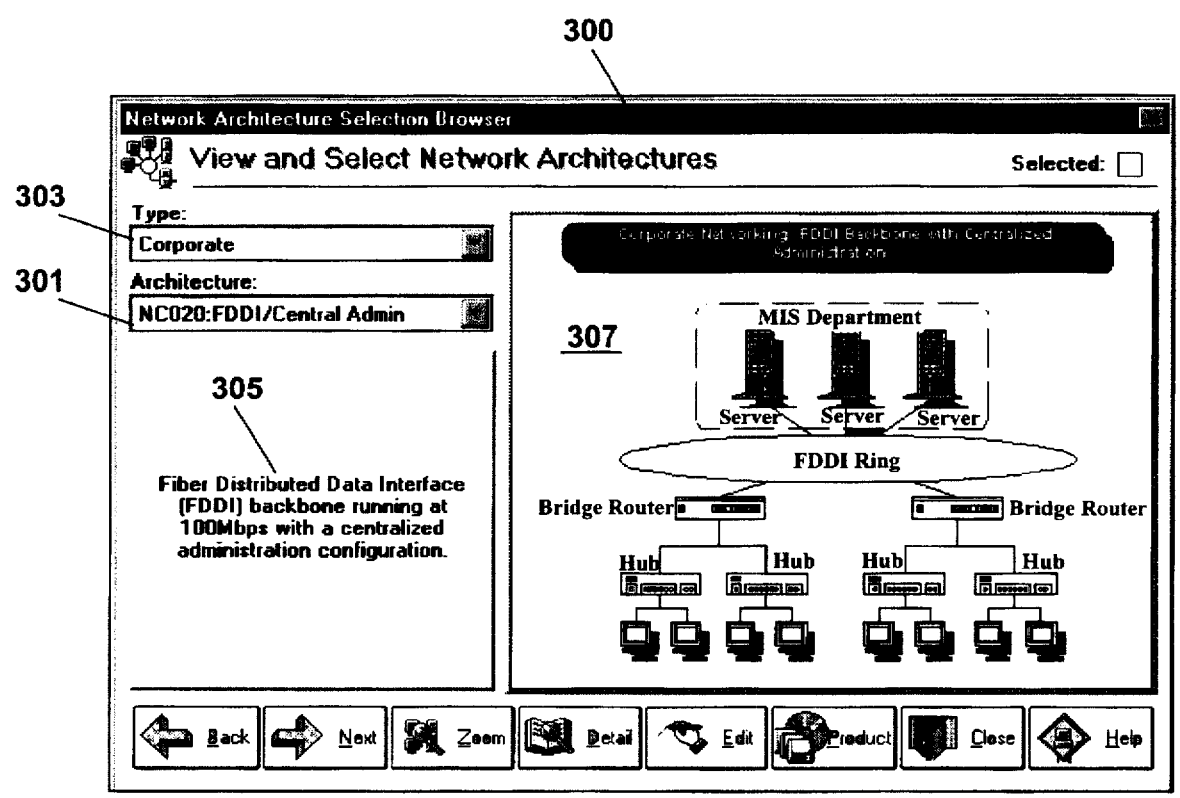
FIG. 3 is an illustration of the user interface for viewing and selecting network architectures.
Figure 4:
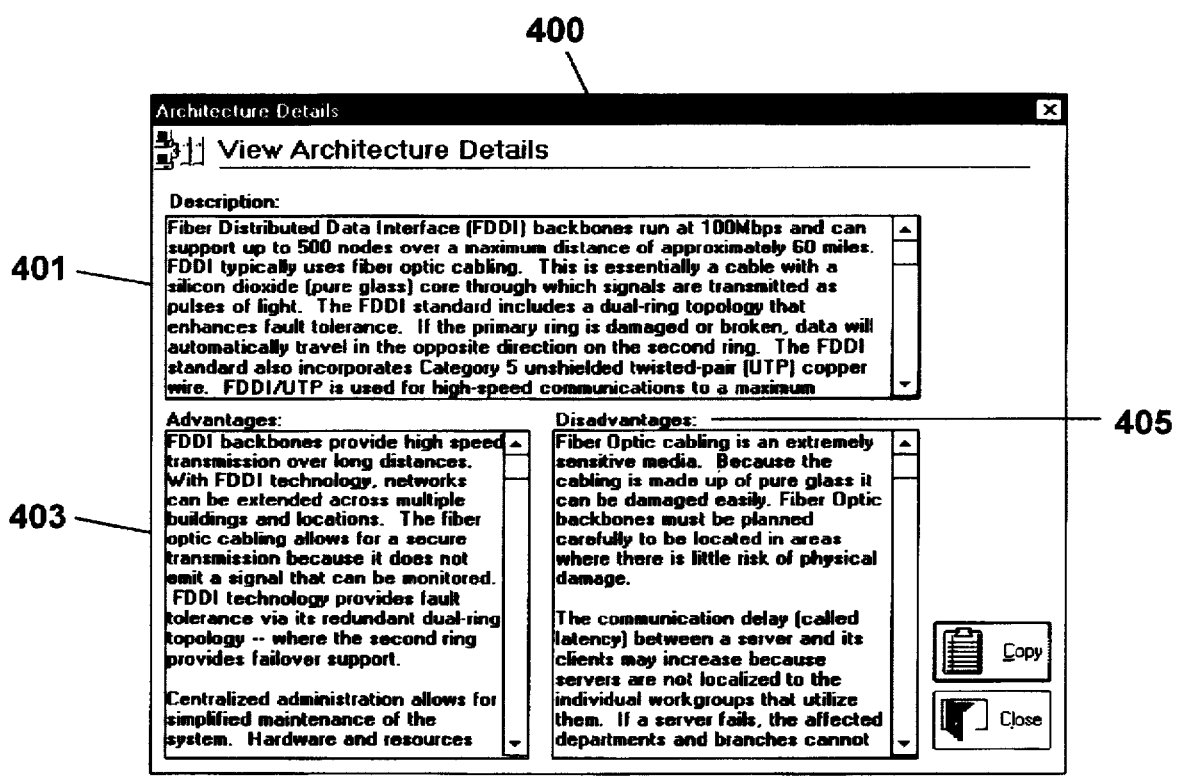
FIG. 4 is an illustration of the user interface for viewing a detailed description of a network architecture.

FIG. 3 illustrates one screen 300 of the user interface 106 for viewing network architectures for investigating their features. In FIG. 3 there is shown the name 301 of the network architecture, its type 303, a brief description 305, and its diagram 307. The user may move forward or backward through the architecture library 108 with the next and backward buttons, and review a more detailed description with the detail button. Expert users may edit the with the edit button. The detailed description screen 400 is illustrated in FIG. 4, and includes a detailed description 401, advantages 403, and disadvantages 405. The user can copy any of the text blocks and paste them into other documents, thereby facilitating the creation of project plans, proposals, or other documentation.

Appendix A contains a listing of network architectures and descriptions included in one embodiment of the architecture library 108. Appendix B contains example descriptions, advantages, and disadvantages for four network architectures.

Each network architecture is also defined by a set of qualities, each quality associated with at least one quality value. These qualities are used by the associative matching algorithm 120 to match against the user's required qualities to select and rank selected network architectures for the user to evaluate.

Users (for example system administrators, or consultants) are able to define their own network architectures for inclusion in the architecture library 108. This may be done by modifying the description and qualities of an existing architecture and saving it back to the database under a new name, or adding a completely new network architecture along with its qualities. No changes to the expert system rules or set of qualities are needed. The associative matching algorithm 120 will automatically include this new network architecture when selecting matching network architectures to the required qualities 124.

Data Elements of Architectures

The architecture library 108 includes several relational tables that store the descriptions of the network architectures along with their qualities in a relational database. Table 1 defines one embodiment of the architecture library 108. The italicized attributes are primary keys.

TABLE 1

Architecture Library

| Data Entity | Data Attribute | Attribute Description |
| --- | --- | --- |
| Architecture Types | Architecture Type | Architecture type—Workgroup, Corporate, Branch Office, Enterprise, Remote Access, Internet, Intranet, Two-tier Middleware, Three-tier Middleware |
|  | Architecture Type Description | Textual description of architecture type |
| Architectures | Architecture ID | Integer uniquely identifying an architecture |
|  | Architecture Name | Textual name of architecture |
|  | Architecture Type | Links to an entry in Architecture Types table |
|  | File Name | File name on disk where architecture diagram is stored |
|  | Architecture Short Description | Short textual description of architecture |
| Architecture Descriptions | Architecture ID | Links to an entry in Architectures table |
|  | Architecture Description Type | Type of description—Long Description, Advantages ("Plus"), Disadvantages ("Minus") |
|  | Architecture Description | Long textual description of architecture |
| Architecture Selections | Architecture ID | Links to an entry in Architectures table |
|  | Project ID | Links to a specific project plan. |
|  | Architecture Score | Numeric score ranking the architecture |
|  | Architecture Selection Explanation | Description of why Associative Matching Algorithm selected and scored architecture as it did |
| Architecture Qualities | Architecture ID | Links to an entry in Architectures table |
|  | Quality ID | Links to a quality in Quality table |

TABLE 1-continued

Architecture Library

| Data Entity | Data Attribute | Attribute Description |
|---|---|---|
| | Quality Operator | Operator for matching of required qualities |
| | Quality Value | Actual value for quality for this object |

The architecture types table defines the types of network architectures described in the architecture advisor 104. The architectures in the architecture advisor 102 may be grouped into the following types:
1. Workgroup, 2. Corporate, 3. Branch Office,
4. Enterprise, 5. Remote Access, 6. Internet,
7. Intranet, 8. Two-tier Middleware 9. Three-tier Middleware.

Each type is associated with a type description.

The individual network architecture are described by the architectures table. Each network architecture has a unique architecture ID, a name, an association with an architecture type, a file name of the architecture diagram, and a short text description.

The architecture descriptions table provides the more detailed description of each network architecture. Each architecture description is linked to an architecture by the architecture ID, and includes a description type (long, advantages, disadvantages), and the text of the description. The description type is used to place the various descriptions into the appropriate portions of the user interface (see FIG. 4).

The architecture selections table is the set of selected network architectures output by the associative matching algorithm 120. Each of the selected network architecture is linked to one of the defined network architectures by the architecture ID. A project ID is used to associate the selected network architecture to a specific implementation project, allowing the user to process multiple projects with the architecture advisor 102 (a project plan table is not shown). For each selected network architecture there is an architecture score which is the total score output by the associative matching algorithm 120. The architecture selection explanation is a text block generated by the associative matching algorithm 120 during the matching process that explains the particular scoring of the selected network architecture.

Finally, the network architectures are defined by a set of qualities through the architecture qualities table which links individual architectures by architecture ID with individual qualities by a quality ID (explained below). A quality operator describes how the specific quality is applied to the architecture, and is used to determine whether the quality satisfies a required quality.

Qualities

The expert system 114 produces a set of required qualities 124 after processing the rules 118 for transforming the questionnaire answers into qualities. Qualities are stored in the same database as the architecture library 108 and are defined by experts.

In one preferred embodiment, the qualities are preferably constructed so that they are orthogonal, meaning that the qualities are independent of each other. Orthogonal qualities can be combined in almost any way with each other and will be logically consistent. The qualities are also preferably minimal, meaning that all of the factors which affect architecture selection for an output entity (e.g. network architecture) are represented using as few qualities as possible. Qualities are also preferably hierarchical in that if a higher-level quality is instantiated for an output entity, then a set of more detailed qualities is provided to define the full information on that quality. The hierarchical qualities thus form parent qualities which have child qualities, recursively for at least two levels in a hierarchical tree of qualities. In the case of hierarchical qualities, orthogonality means that each branch of the hierarchical tree is independent of any other branch. Qualities may also be are also grouped into a set of logically-related categories. While orthogonal, hierarchical qualities are preferred, the present invention may also be used with non-orthogonal, non-hierarchical sets of qualities.

In the process of answering questions in the user questionnaire 112, the user can optionally prioritize various requirements, thereby inducing the assignment of weights to qualities associated with these requirements. This allows the user to instill their tradeoffs or preferences into the selection of a suitable network architecture. The input of weighting is preferably by multi-wise comparison. For example, the user may be asked which of the qualities of COST or PERFORMANCE is more important, with the architecture advisor 104 iterating through the various qualities until an order of all or some qualities is obtained. Alternatively, the weighting may be direct, for example by the user inputting a weight between 1 and 100, and the architecture advisor 104 then normalizing all weights on a predetermined scale.

Detailed Description of Qualities

In one embodiment of the present invention, each quality has a type and a value. There are 3 types of qualities: "level", "symbol", and "parent". Level qualities take as their value integers between 1 and some maximum value. The maximum value will vary for different level qualities. Symbol qualities consist of strings of one or more symbols (tokens) in a list. Parent qualities are also symbols (tokens) and define a hierarchical quality, creating a branch point in the quality hierarchy.

Qualities are either object qualities or are required qualities. Object qualities are the qualities used to define an output entity, such as a network architecture and associated therewith through the architecture qualities table (See Table 1) in the architecture library 108. Object qualities make the output entities self describing.

Required qualities describe the properties of the network architecture being developed by the user and are derived from the answers 115 to user questionnaire 112.

Required symbol qualities must be atomic. Object symbol qualities may be a list of symbols.

Each object quality has an operator. The quality operator describes how the value of the quality is applied with respect to the value of the required quality. For example, a level object quality (e.g. number of users for a LAN may have a value of 100 and an operator of "<=", meaning the quality pertains for LAN having 100 or fewer users. Required qualities have no operators, since they define the value of the quality that the user has required.

A required quality may have a weight indicating its importance to the project being developed, relative to the other qualities. Object qualities have no weights.

Table 2 summarizes the properties of object qualities and required qualities.

TABLE 2

Quality Properties

| Property | Object Quality | Required Quality |
|---|---|---|
| values | atomic or list | atomic |
| operator | YES | NO |
| weight | NO | YES |

Table 3 defines the types of operators used for the various types of qualities:

TABLE 3

Quality Operators

| Property | Level Quality | Symbol Quality | Parent Quality |
|---|---|---|---|
| operators | =, >=, <= | in, not in | = |

Symbol qualities only have the operators. "in" and "not in". These operators mean that an entity either has or does not have the characteristic defined by the value of the quality. Level qualities have three possible operators, "=", ">", and "<=". Parent qualities have only one possible operator, "=".

If an architecture is not assigned a particular object quality, this means the architecture is independent of that quality and by default satisfies that quality. If an object quality is left out for an architecture, this means the architecture "does it".

The grammar of object qualities associated with object X is as follows:

General format:

Architecture X has "quality_name" "quality_operator" "quality_value"

Example of object level quality:

Architecture 866 has "criticality level" ">=" "2"

Example of object type quality:

Architecture 866 has "Legacy System Interface Type" "in" "1-way synchronous", "1-way asynchronous"

Example of object parent type quality:

Architecture 866 has "Application Parent Type""OLTP"

The grammar of required qualities resulting from the questionnaire is as follows:

General Format:

System will have "quality_name"="quality_value" with weight "quality_weight"

Example of required level quality:

System will have "Future Growth Level"="3" with weight "1"

Example of required symbol quality:

System will have "WAN Network Traffic Profile Type"= "Bursty" with weight "5"

Example of required parent quality:

System will have "Application Parent Type"="OLTP"

Data Elements for Qualities

The qualities described above are implemented in a number of relational tables in the database with the architecture library 108. Table 4 defines these qualities tables 110.

TABLE 4

Quality Tables

| Data Entity | Data Attribute | Attribute Description |
|---|---|---|
| Quality Types | Quality Type | Quality type—"Symbol", "Level", or "Parent" |
|  | Quality Type Description | Textual description of quality type |
| Quality | Quality ID | Integer uniquely identifying a quality |
|  | Quality Name | Textual name of quality |
|  | Quality Type | Links to an entry in Quality Types table |
|  | Parent Quality ID | Links to a parent quality in Quality table |
|  | Quality Description | Textual description of quality |
|  | Quality Default Weight | Default weight for quality |
| Quality Possible Values | Quality ID | Links to an entry in Quality table |
|  | Quality Value | Possible value for quality |
|  | Quality Value Description | Description of the quality value to assist users in assigning quality values to specific architectures. |
| Required Qualities | Project Plan ID | Links to a project plan in a project table |
|  | Quality ID | Links to a quality in Quality table |
|  | Quality Value | Required value for quality for this project plan |
|  | Quality Weight | Importance/Priority of quality relative to others |
| Object Qualities | Architecture ID | Links to an entry in Architectures table |
|  | Quality ID | Links to a quality in Quality table |
|  | Quality Operator | Operator for matching of required qualities. One of "=", "!=", ">=", "<=", "in" or "not_in" |
|  | Quality Value | Actual value for quality for this object |

The quality types are defined by a quality type table having a type attribute and a type description corresponding to the types described above. The qualities themselves are defined by the quality table, which has a unique quality ID, a quality name, a link to the quality type table to define its type, a parent quality ID which, if present, contains the quality ID of a parent quality, thereby defining a child quality to the parent. The quality description contains a text description of the nature of the quality.

The quality possible values table defines for each quality (by quality ID) the possible values for the quality, whether atomic or a list.

The required qualities table defines the required qualities 124. Required qualities have a quality ID which links them to one of the defined qualities in the quality table. Each required quality includes a quality value which is determined by the expert system 114 upon processing of the user's answers, and optional weight that describes the relative importance or priority of the quality. In this example, the required qualities also have a project plan ID which links them to a specific project plan defined in a separate table. Project plans are not a necessary element of the present invention.

Object qualities are associated with a particular network architecture by an architecture ID and with a particular quality by a quality ID. The object qualities have a quality operator, as described above, and a quality value.

Table 5 provides a sample listing of various different qualities, including their name, their parent ID to show the hierarchical relationship if any, and their possible values.

TABLE 5

List of Qualities

| Qual ID | Quality Name (Type) | Parent Qual ID | Quality Possible Values |
|---|---|---|---|
| 100 | Cost (Level) | | 1,2,3,4 |
| 101 | Data Distribution (Level) | | 1,2,3 |
| 102 | Processing Distribution (Level) | | 1,2,3 |
| 103 | Future Growth (Level) | | 1,2,3 |
| 104 | Legacy System Interface (Symbol) | | 1-way synchronous, 1-way asynchronous, 2-way synchronous, 2-way asynchronous |
| 105 | System Management (Symbol) | | single-image, central, distributed |
| 106 | Application Parent (Parent) | | OLTP, Data Warehouse, Intranet, Internet, Groupware |
| 107 | Data Volume (Level) | 106 | 1,2,3,4 |
| 108 | OLTP Transaction Volume (Level) | 106 | 1,2,3,4 |
| 109 | Geographic Extent Parent (Parent) | | LAN, MAN, WAN |
| 110 | WAN - Latency (Level) | 109 | 1,2,3,4 |
| 111 | WAN Network Traffic Profile (Symbol) | 109 | bursty, not bursty |
| 112 | WAN Provider Preference (Symbol) | 109 | ATT, MCI, Sprint, Other |
| 113 | WAN Scope (Symbol) | 109 | domestic only, domestic+international, primarily international |
| 114 | LAN Size (Level) | 109 | 1,2,3 |
| 115 | LAN Availability (Level) | 109 | 1,2,3,4 |
| 116 | LAN Performance (Level) | 109 | 1,2,3,4 |
| 117 | LAN Network Traffic Profile (Symbol) | 109 | bursty, not bursty |
| 118 | Usage Extent (Symbol) | | work group, branch office, corporate, enterprise |
| 119 | Performance Scalability (Level) | | 1,2,3,4 |
| 120 | Userbase Size (Level) | | 1,2,3,4 |
| 121 | Userbase Size Scalability (Level) | | 1,2,3,4 |
| 122 | Database Size (Level) | | 1,2,3,4 |
| 123 | Database Size Scalability (Level) | | 1,2,3,4 |
| 124 | Open Systems Adherence (Level) | | 1,2 |
| 125 | Schedule Constraint (Level) | | 1,2,3,4 |
| 126 | Data Translation (Level) | | 1,2,3 |
| 127 | Delivery Preference (Symbol) | | incremental, all_at_once |
| 128 | Existing System Reengineering (Level) | | 1,2,3 |
| 129 | Security (Level) | | 1,2,3,4 |
| 130 | Data Refresh Timeliness (Level) | | 1,2 |
| 131 | Corporate Repository (Symbol) | | YES, NO |
| 132 | Flexibility (Level) | | 1,2,3 |
| 133 | Data Volatility (Level) | | 1,2,3,4 |
| 135 | Implementation Effort (Level) | | 1,2,3 |
| 136 | Local Data Views Required (Symbol) | | YES, NO |

Note for example, that the Application Parent quality is a parent quality having children Data Volume (a level type quality) and OLTP Transaction Volume Level.

Assignment of Architecture Qualities

The assignment of qualities to architectures is done by experts familiar with the design of computer networking problems in general, and preferably with client/server networks in particular. An example of the assignment of qualities to a network architecture is as follows, as illustrated in Table 6:

Architecture Name: E070:Fault-tolerant system

Architecture Description: Enterprise client/server computing: A fault-tolerant system provides high availability through redundant network, data and CPU.

TABLE 6

Quality Assignments for E070: Fault-Tolerant System

| Qual ID | Quality Name | Operator | Quality Value |
|---|---|---|---|
| 100 | Cost | <= | 2 |
| 101 | Data Distribution | <= | 2 |
| 102 | Processing Distribution | <= | 2 |
| 103 | Future Growth | >= | 1 |
| 105 | System Management | in | single-image, central, distributed |
| 106 | Application Parent | | OLTP |
| 108 | OLTP Transaction Volume | >= | 1 |
| 109 | Geographic Extent Parent | in | LAN |
| 115 | Availability | = | 4 |
| 116 | Performance | >= | 2 |
| 117 | Network Traffic Profile | in | bursty |

Users can add their own architectures to the architecture library 108, along with their own evaluation of the qualities. This allows network experts and consultants (who are not likely to be programming experts adept at programming an expert system) to easily modify the architecture advisor 104 to include new network architectures based on ongoing experience without having to reprogram the architecture advisor 104 with new rules.

Figure 5:
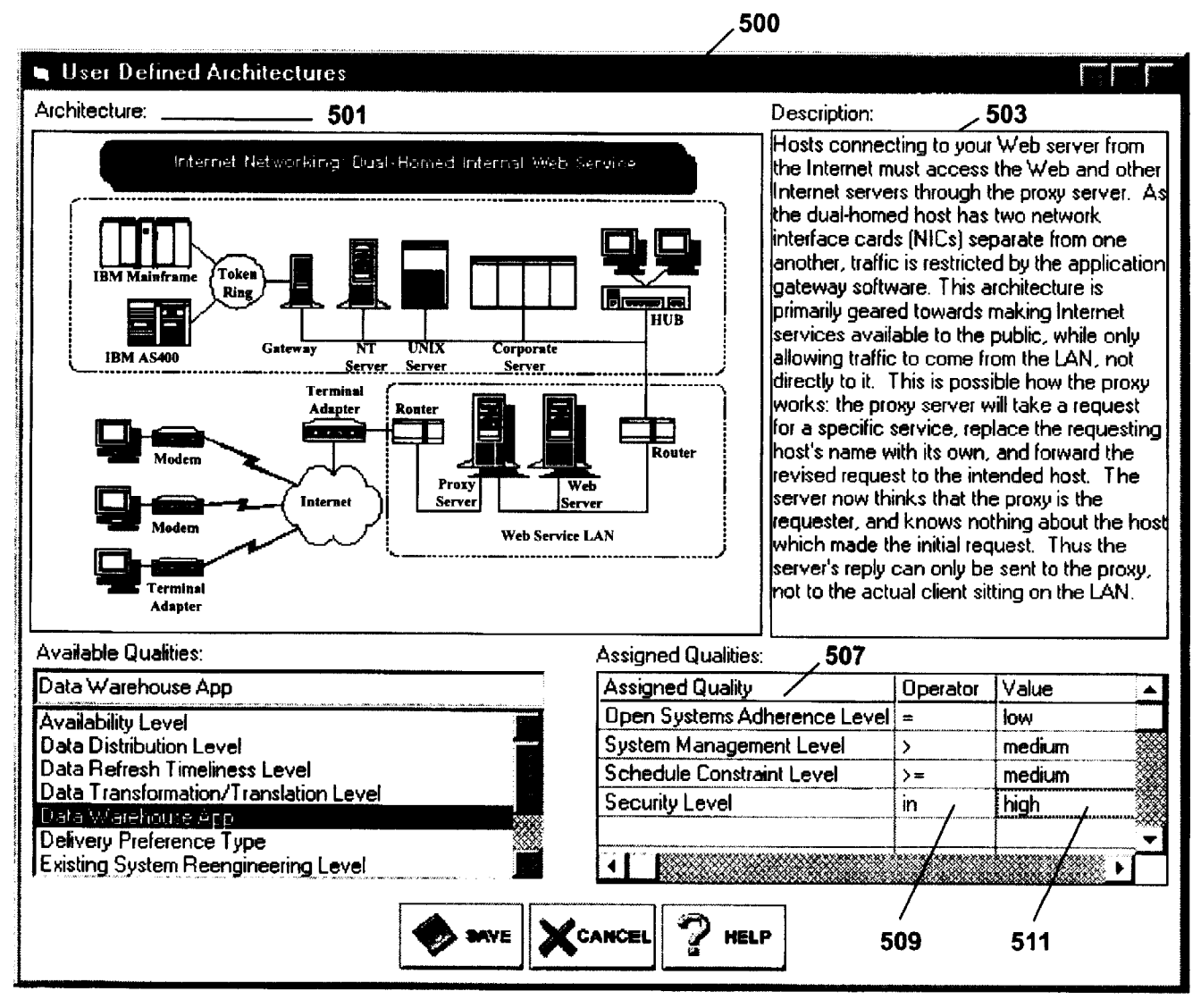

Referring now to FIG. 5, to support the addition of new network architectures, the user interface 106 contains a screen 500 for assigning qualities to architectures, or modifying the qualities for existing architectures.

The top of the screen displays the name 501 and description 503 of a selected architecture. A table 505 in the bottom left of the screen lists the available object qualities, and allows users to select an object quality to assign to the architecture. The assigned object quality is then listed in table 507. Here the user specifies a value 511 (or list of values) and an operator 509 for the object quality. Values and operators are chosen from pre-defined lists of values and operators; users cannot make up new values or operators. The semantics of qualities associated with architectures is described above. When done, the user clicks on the save button to store the quality assignments, whereby the architecture advisor 104 updates the appropriate tables in the database. As FIG. 5 demonstrates, no detailed programming of the expert system 114 is required to update the database to include new network architectures. The user interface and database routines for the addition of diagrams, and text descriptions for a new network architecture is straightforward to those of skill in the art.

Quality Weights

In one embodiment, the present invention provides for the optional weighting of individual qualities in the quality space and the use of these weights to determine the ranking of output entities in the output space, thereby influencing the degree to which the output entities match the required qualities derived from user inputs. Quality weights for the required qualities allows the system to use heuristics in order to establish preferences and allow for tradeoffs between any qualities, by establishing the relative importance between qualities derived from required features.

Generally, human judgments regarding tradeoffs frequently take the form:

"All other things being equal, I'd rather have X than Y."
or
"I'd give up some X to get more Y up to a point."

In essence, humans establish priorities between features, within the context of constraints.

Accordingly, in a preferred embodiment, the weights may be applied to any desired subset of the qualities and provide a weighted ranking among that subset of qualities, i.e., those qualities between which tradeoffs need to be established.

The capability of producing weights from the user's responses is provided in four steps:

1. Determine which qualities need to be weighted.
2. Define the form in which the weights are delivered.
3. Assign default values to the weights.
4. Adjust weights in response to user inputs The first three steps are not done in real-time, but are done as part of the software development process when implementing the present invention, and the default weights are included in the rules of the expert system 114. The fourth step also occurs in the expert system 114 in response to weights provided by the user in the answers 115 to the user questionnaire 112. In one embodiment, weights are themselves established as qualities whose sole purpose is to determine weights associated with the user's priorities. Not every required quality is assigned a weight by the expert system 114, only the ones that present a trade-off issue and needs user prioritization. Default weights may be used for the other qualities.

The qualities to be weighted are preferably determined by experts in the application domain, such as network designers, since not all qualities need be weighted. Generally, qualities should be weighted where there are constraints or tradeoffs between qualities that prevents simultaneous maximization of multiple qualities. Table 7 describes various constraints and tradeoffs for different qualities applicable to the design of computer networks.

TABLE 7

| Quality Constraints and Tradeoffs | | |
|---|---|---|
| Quality | Defining constraints | Possible Tradeoffs |
| Cost | How important is it to stay within the budget, or to what extent can additional funds be used to gain other desired qualities? | Additional funds can be used for increased performance |
| Performance | What is the minimum acceptable performance, measured either in network traffic load, or user response time? | Some performance degradation may be permissible, some percent of the time. This will reduce cost. |
| Expandability /scalability | It is important to plan for possible reorganization of workgroups and minimize the rewiring or the network as the result? | This may only apply to Enterprise networks. |
| System management | Will the majority of the corporate servers be placed in a centralized location, such as a data center, or will the majority of servers be distributed to individual departments? Do critical network components need to be | Adds to cost, takes longer time to install. |

TABLE 7-continued

| Quality Constraints and Tradeoffs | | |
|---|---|---|
| Quality | Defining constraints | Possible Tradeoffs |
| | managed from a centralized location or can they be managed from multiple access points on the network? | |
| Criticality / availability | How much up-time is required? Is 7 × 24 availability required, or normal work hours? Is it necessary to install redundant WAN links for fault tolerance? | Adds to cost for installation and maintenance. |
| Network security | How secure does the Web server need to be and how secure do other attached networks need to be from internal access? | This is only a requirement for Internet/Intranet applications. |

Once the constraints and tradeoffs are understood and qualities selected for weighting relative to other qualities, the method and form by which weights are applied is determined. In one embodiment, weights are expressed as a unit-less integer between selected minimum and maximum values (e.g. 0 and 100) for each of quality that is to be weighted. Two qualities may then be compared by comparing their weights algebraically. For example, if a cost quality has a weight of 100, and a performance quality has a weight of 50, then cost is twice as important as performance.

Default weights are then assigned to the selected qualities, and are incorporated into the appropriate rules of the expert system 114, further described below. In one embodiment, the qualities to be weighted, and their default values are:

| Quality | Weight |
|---|---|
| cost level | 80 |
| performance level | 40 |
| expandability /scalability level | 10 |
| system management level | 10 |
| criticality / availability level | 20 |
| network security level | 40 |

User Questionnaire

Figure 6:
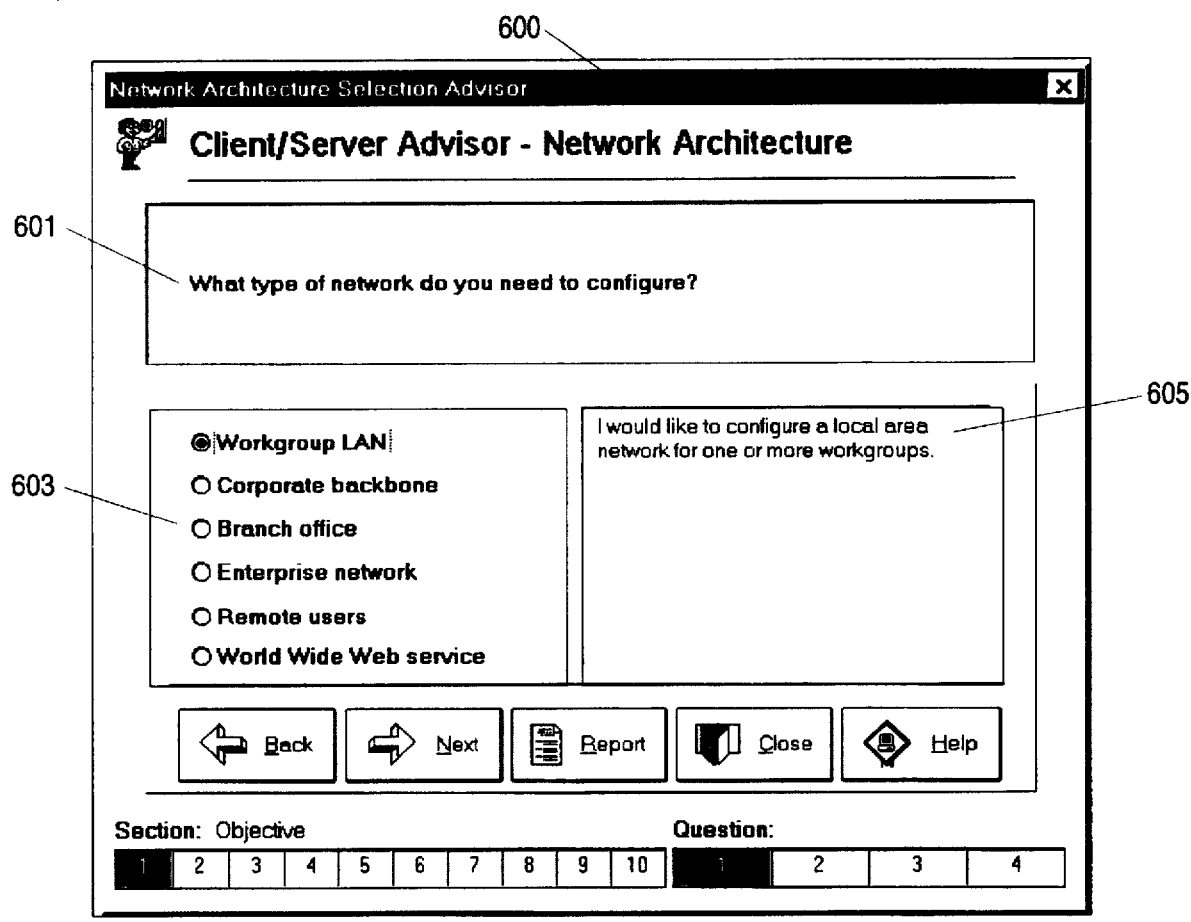
FIG. 6 is an illustration of a sample question in the user questionnaire.

Referring again to FIG. 1, the quality driven expert system of the present invention includes an interactive questionnaire 112 which guides the user through a set of screens containing questions and answers concerning the system under development. FIG. 6 illustrates a sample screen 600 in the user questionnaire 112. Each screen contains one question 601 and a set of possible answers 603 with a check box or radio button beside each answer. Users click on an answer to select it. Multiple answers are supported. Each answer preferably has a description 605 and may include a short example, to make it clear to the user what implications the answer has, and thereby ensure the user's understanding of the meaning and significance of the question. When the user has answered a question, they click the next button to proceed to the next question. At any time they can also press the back button to backtrack and revisit a previous question. Questions are preferably arranged into sections, and the screen 600 further indicates the particular section number and heading of questions being answered and the question number.

Example questions asked by the architecture advisor 104 are listed below. One or more questions are grouped under the section heading in which they appear, and the list of possible responses for each question is listed.

Objective Section

What type of network do you need to configure? (choose one)
Workgroup LAN
Corporate backbone
Branch office
Enterprise network
Remote users
World Wide Web service Do you expect your network to be more user-intensive or bandwidth-intensive? (choose one)
User-intensive
Bandwidth-intensive
Both
Neither

Workgroup Networking Section

Do you have a LAN strategy that you need to preserve? (choose one)
Ethernet
Token Ring
ARCnet
No Do you want to build a wireless LAN for mobile users? (choose one)
Yes
No One exemplary set of questions for the architecture advisor 104 is listed in Appendix C.

The user's answers to the user questionnaire 112 are encoded in a fact list as a set of (attribute, value) pairs, the value defined by the user's answer, the attribute associated with a fact representing the question. For example, if the user chooses "Workgroup LAN", "User Intensive", "ARCnet", and "Yes" to the foregoing questions, then the fact list would contain:

(FACT_NET_TYPE, WORKGROUP)
(FACT_NET_USAGE, USER)
(FACT_LAN_STRATEGY, ARCNET)
(FACT_WIRELESS_LAN, YES).

Questions are chosen by the experts from which the qualities may be inferred by the expert system, as well as to elicit the system requirements. The qualities will be orthogonal to the greatest extent possible, but the questions need not be. Questions are designed preferably after the qualities have been determined.

Figure 7:
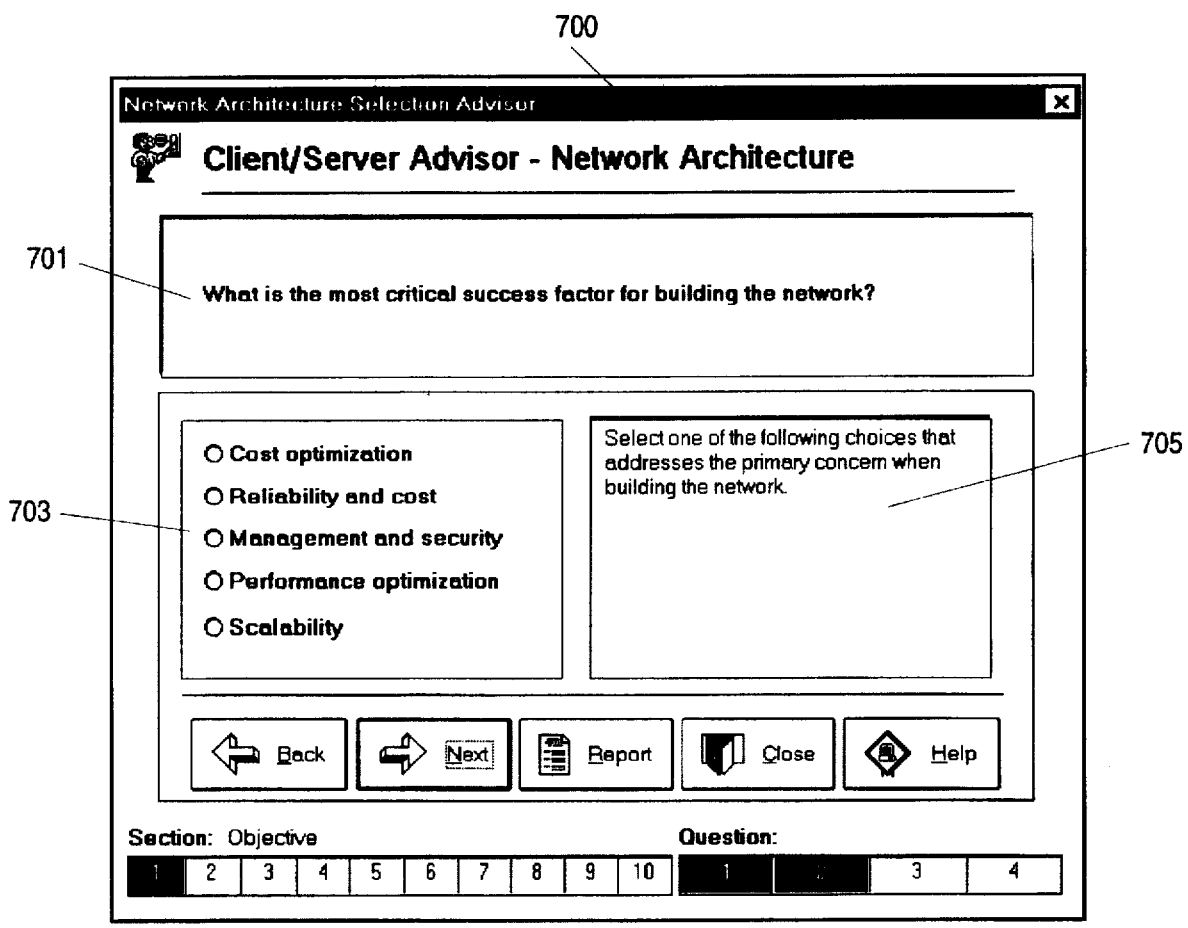
FIG. 7 is an illustration of another sample question in the user questionnaire for determining the weighting of requirements.

The questions may also be used to establish the relative importance of the requirements, and thereby the weights of the required qualities, for example by relative comparison. FIG. 7 illustrates a question screen 700 including a question 701 asking the user to identify the most important success factor 703 for the network. These types of ranking or comparison can be repeated until all qualities for which weights are applicable are ordered by the user. Weights are computed by and assigned to the correct qualities by the rules in the expert system 114. The weights associated with these qualities are stored in the required qualities table, along with the quality ID and quality value. The remaining qualities are assigned their default weights, which are not controlled by the user but by the system administrator.

The question format illustrated in FIG. 7 is but one way to obtain user weights. An alternative approach is multi-wise comparisons. The following question illustrates this method:

Question: In what order do you want to optimize on security, performance and cost?
Security—cost—performance
Security—performance—cost
Performance—cost—security
Performance—security—cost
Cost—performance—security
Cost—security—performance Selection by the user of one of these options determines the ordering of the qualities, and the expert system 114 can then determine the relative weights.

Expert System

The expert system 114 converts the questionnaire answers 115 to a set of required qualities 124. The expert system 114 includes a database of rules 118 and a forward chaining inference engine 116. Generally, the rules 118 are structured to associate facts from the fact list with specific qualities in the quality space, and to derive the weights for any qualities for which weights are applicable. The rules are derived by normal knowledge engineering on the application domain in conjunction with determining the appropriate qualities of the domain. Once encoded they need not be modified to incorporate new candidates into the output space of the system.

In a preferred embodiment, the rules are stored in three tables in the database. Table 8 defines these rule tables 118 in more detail.

TABLE 8

Rule Tables 118

| Data Entity | Data Attribute | Attribute Description |
|---|---|---|
| Rule_Base | rulebase_id | Integer uniquely identifying a comprehensive set of rules. |
| | rulebase_name | Short name of a rule base. |
| | description | Long name of the rule base. |
| Rule | rulebase_id | Integer uniquely identifying a comprehensive set of rules. It links to the Rule_Base table. Part of the composite primary key. |
| | rule_id | Integer uniquely identifying one rule within a rule base. Part of the composite primary key. |
| | rule_name | Textual name of this rule. |
| | description | Commentary on the rule, for user display and diagnostic. |
| | priority | Integer that defines the order in which this rule will be applied, compared with other rules. |
| Rule_Part | rulebase_id | Integer uniquely identifying a comprehensive set of rules. Part of the composite primary key. It links to the Rule_Base and Rule tables. |
| | rule_id | Integer uniquely identifying one rule within a rule base. Part of the composite primary key. |
| | rulepart_id | Integer uniquely identifying this rule part as a component within a single rule. |
| | side | 'L' or 'R', indicating whether this rule part is a component of the |

TABLE 8-continued

Rule Tables 118

| Data Entity | Data Attribute | Attribute Description |
|---|---|---|
| | | LHS (left-hand side, or IF part) of an expert system rule, or the RHS (right-hand side, or THEN part) |
| | attribute | The name of a fact. |
| | value | If this rule part is an LHS, then this is the value to which the attribute is compared, depending on the operator. If this rule part is an RHS, then this is the value assigned to the fact, if this rule fires. |
| | operator | '=', '!=', or 'IN' for LHS. For an RHS, this is always '=', indicating assignment of a new fact. |

The Rule_Base table defines the names and unique IDs for all "rule bases." A rule base is a specific application domain, and may be associated with any number of specific rules. For example, there may be rule bases for network architecture selection, project plan management, task selection for projects, and so on for any variety of different application domains. Inclusion of the rule base table further enhances the flexibility of the present invention since multiple different application domains may be operated upon in a single implementation, each having its own rule base and set of rules and qualities. Thus a single project (such as the design and implementation of computer system) may use one system having rule bases for selection of network architectures, selection of tasks for implementating an a computer system, selection of software and hardware components, and the so forth.

A Rule table defines the names and unique IDs for individual rules within a rule base. These are the particular rules which define the relationships between the user's answers and the qualities. Each rule is linked to a specific rule base by a rule base ID, and has a description describing the purpose, use, or derivation of the rule, and a priority. The priority is used in an agenda to determine the firing order of the rules.

Each rule is comprised of an antecedent and consequent. These parts are defined in a Rule_Part table that contains the text of each rule, with separate records for the IF part and THEN part of the rule. Each rule part is linked to its rule base by the rule base ID, and to its rule by the rule ID. A rule part has a side attribute indicating whether the rule part is the left hand side (antecedent) or right hand side (consequent) of the rule. Each rule part has an attribute which is the name of a fact as it appears in the fact list upon which the rule part operates. The value of the rule part is either the value of the fact to be matched if the rule part is the antecedent or the value to be set if the rule part is the consequent. Rule antecedents may also operate on the value of a quality for encoding those rules that operate on a quality directly. This allows required qualities to be derived from other qualities, rather than merely from facts. Finally, each rule part has an operator defining the operation of that part of the rule. The operators for the antecedent rule part are "=", "!=", and "IN". For consequent rule parts, which are always assignments, the operator The expert system 114 maps the facts from the fact list onto the qualities of the quality space through the use of a new "setqual" verb in the consequent rule parts which is used to assign values to qualities (conventional expert systems typically are limited to setting values to facts). The setqual verb takes as its arguments one of the qualities defined in the quality space, and a value, which may be a token, level, or boolean. Here is an example rule using the setqual verb:

| If | [Application type] = World Wide Web site and [Internet user] = Remote users |
|---|---|
| Then | [setfact Internet] = True [setqual Dispersed] = True |

Referring again to Table 8, the required qualities derived by the expert system 114 are stored in the required qualities table, as described above. The required quality has a quality value which can be set by a value specified in the setqual verb of some rule. When a rule with a setqual verb is fired, the expert system 114 takes the name of the quality from the setqual and retrieves the associated quality ID from the quality table. The expert system 114 stores the (quality ID, quality textual value) pairs in the required qualities table, where they are available to the associative matching algorithm 120 for subsequent matching with the qualities of the network architectures.

An example of the implementation is as follows. Assume the rules of the expert system 114 include:

| Rule 370 | |
|---|---|
| If | [Application type] = World Wide Web site and [Internet user] = Remote users |
| Then | [setfact Internet] = True [setqual Dispersed] = True |
| Rule 380 | |
| If | [Application type] = World Wide Web site and [Internet user] = Corporate users |
| Then | [setfact Intranet] = True [setqual Dispersed] = True |
| Rule 390 | |
| If | [Application type] = World Wide Web site and [Internet user] = Both |
| Then | [setfact Intranet] = True [setqual Dispersed] = False |

The rule tables 118 would be encoded as:

TABLE 9

Example Rule_Base Table

| rulebase_id | rulebase_name | description |
|---|---|---|
| 1 | Architecture Advisor | Architecture selection rule base |
| 2 | Task Advisor | Task advisor rule base |
| 3 | Network Advisor | CSCL network selection rule base |

Here, the Rule_Base table identifies three distinct rule bases. The following Rule table lists the rule names with the description of their antecedents and their firing priority.

TABLE 10

Example Rule Table

| rulebase_id | rule_id | rule_name | description | priority |
|---|---|---|---|---|
| 3 | 370 | Web Remote Users | If Web and remote users only | 1 |
| 3 | 380 | Web Corporate | If Web and corporate | 1 |

TABLE 10-continued

Example Rule Table

| rulebase_id | rule_id | rule_name | description | priority |
|---|---|---|---|---|
| 3 | 390 | Web Both | users only If Web and corporate + remote users | 1 |

Each of these rules is encoded in the Rule_Part table as follows:

TABLE 11

Example Rule_Part

| rule-base_id | rule_id | rule-part_id | side | attribute | value | operator |
|---|---|---|---|---|---|---|
| 3 | 370 | 1 | L | Application type | World Wide Web site | = |
| 3 | 370 | 2 | L | Internet user | Remote users | = |
| 3 | 370 | 3 | R | X Internet | True | = |
| 3 | 380 | 1 | L | Application type | World Wide Web site | = |
| 3 | 380 | 2 | L | Internet user | Corporate users | = |
| 3 | 380 | 3 | R | X Intranet | True | = |
| 3 | 390 | 1 | L | Application type | World Wide Web site | = |
| 3 | 390 | 2 | L | Internet user | Both | = |
| 3 | 390 | 3 | R | X Intranet | True | = |

Given these encoded rules, assume that the user's answers to some set of questions produced the following facts:

Application Type="World Wide Web site"; and,

Internet user="Remote"

Based on these facts and the rules listed above, the expert system 114 determines that the quality "Dispersed" will be "True." This is encoded as a required quality in the required qualities table:

TABLE 12

Example Required Qualities Table

| qual_id | qual_value |
|---|---|
| 400 | True |

Appendix D provides another more detailed example of the determination of required qualities from the user questionnaire.

The expert system 114 operates using the following operational algorithm:

```
While there are rules in the agenda
    Select a rule from the agenda, based on its priority
    Fire the rule. This may involve adding another fact to the
        fact list, setting a quality in the Required_Qualities
        table, or performing a side effect.
    Remove the rule from the agenda
    Validate the agenda (i.e., remove any rules that are no
        longer valid)
```

-continued

```
    For all rules in the rule list:
        Select qualified rules (i.e., their left-hand side or "IF"
            part matches against the facts in the fact list)
            and put them in the agenda;
End While
```

As described above, the agenda is the list of rules that remain to be fired, the rule list is the list of all rules in the appropriate rule base (from the Rules table), and the fact list is the encoded set of answers 115. The expert system 114 traverses the agenda and fires the rules contained therein. These rules may set facts or qualities. Once fired a rule is removed from the agenda. Validation of rules eliminates from consideration those rules which have unsatisfied antecedents. Upon completion of the agenda, the required qualities will all be listed in the required qualities table.

The various table definitions described herein for the architectures, qualities, and rules are but one implementation of the present invention. Those of skill in the art of software engineering and expert system design will readily appreciate that these various aspects of the present invention may be implemented in various other structures, not limited to the relational tables described for this implementation.

Associative Matching Algorithm

Figure 8:
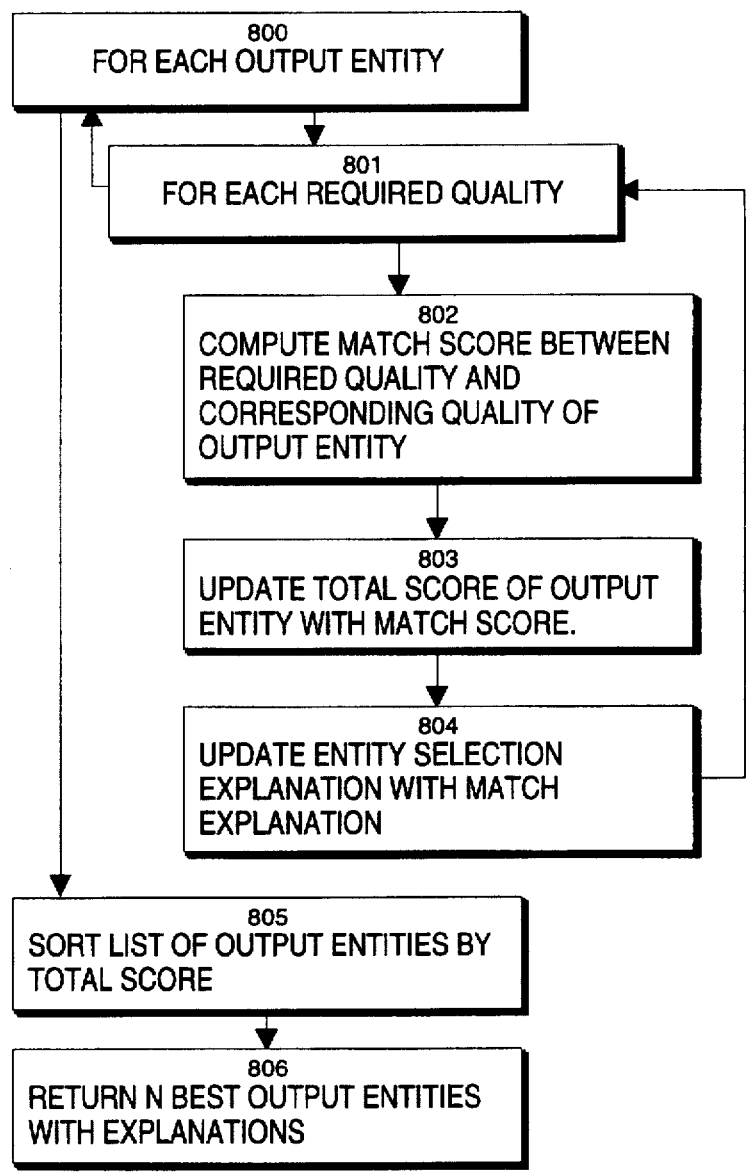
FIG. 8 is a flowchart of the associative matching algorithm.

Referring now to FIG. 8, there is shown a flow diagram of the overall logic of the associative matching algorithm 120. Generally, the associative matching algorithm 120 matches the set of required qualities and weights output by the expert system 114 with the actual qualities associated with selected output entities in the output space, and identifies those entities that best match the required qualities. In one embodiment, the associative matching algorithm 120 traverses 800 through the set of output entities, such as the architectures table of the architecture library 108. For each (or alternatively, for selected ones) of the entities, the associative matching algorithm 120 compares 801 each of the required qualities to a corresponding quality of the entity. This is done by computing 802 a match score between the required quality and the quality of the output entity, based on the values of these qualities, and the weight of the required quality, if any.

A total score of the output entity is maintained and updated 803 each time a required quality match score is determined. For each entity, a selection explanation is also maintained and updated 804. This is textual description that specifies the required quality being matched, and the degree to which the quality value of the corresponding quality of the output entity matches the required quality value.

When the set of output entities is evaluated, they are sorted 805 by their total scores, and the N (e.g. 10) best ranking entities are returned 806 to the user for review and evaluation. The selection explanation of each such entity is also available to allow the user to understood why the entity was selected.

In the embodiment of the architecture advisor 104, the associative matching algorithm 120 matches the required qualities of a network architecture to the qualities of selected architectures in the architecture library 108, to produce an architecture score for the network architecture. It then ranks the network architectures in order of their architecture scores, and provides a selection explanation the scoring of each architecture.

Where the qualities are hierarchical, the associative matching algorithm 120 uses recursive logic to match the required qualities with the object qualities. It uses the weight of a required quality in computing the score for each match.

One embodiment of the associative matching algorithm 120 for evaluating network architectures is described in the following pseudo-code:

```
Main Routine:

Input:   List of required qualities (Required Qualities table)
         List of architectures (by architecture ID)
              List of object qualities for each architecture
              (Architecture Quality table)
         N , the number of best candidate architectures to return
Output:  List of the N best architectures selected
         Architecture score and selection explanation for each
              selected architecture
Operation:
Loop over list of architectures
     Set architecture_score = 0
     Loop over list of top-level (parent) required qualities
          (Required_Qualities table)
          If architecture has a corresponding object quality //
                same Qual ID
               Call routine MatchQualities
                    Input: required_quality, object_quality
                    Output: match_score,
                              match_explanation
                    Set architecture_score += match_score
                    Set architecture_select_explanation +=
                              match_explanation
          End if
     End Loop over required qualities
End Loop over architectures
Sort list of architectures based on architecture score
Return from routine, returning architecture_score and selection
explanation for each of the N best architectures
Routine MatchQualities:

Input:   required_quality; (quality_id from Required Qualities)
         object_quality; with same quality_id
Output:  match_score; the score for how well these qualities match
         match_explanation; textual description of the quality and
         the match
Operation:
If required_quality is a "symbol" quality          // symbol quality
     If required_quality.value satisfies object_quality.operator
              applied to object_quality.value
          Set match_score = required_quality.weight
          Set match_explanation = quality.description + "matches"
     Else                                          // mismatch
          Set match_score = − (required_quality.weight)
          Set match_explanation = quality.description + "does not
              match"
     End If
     Return from MatchQualities routine
Else If this is a level quality                    // numeric
     If required_quality.value satisfies object_quality.operator
              applied to object_quality.value
          Set match_score = required_quality.weight
          Set match_explanation = quality.description + "matches"
     Else                                          // mismatch
          Set match_score = − (required_quality.weight)
          Set match_explanation = quality.description +
              "does not match"
     Return from MatchQualities routine
Else If this is a "parent" quality         // has children qualities
     Set match_score = 0
     Loop over list of child required_qualities for this required quality
          (in Quality table)
          If the architecture has a corresponding child object_quality
               Call routine MatchQualities recursively
                    Input: child required_quality, child
                              object_quality
                    Output: child_match_score,
                              child_match_description
                    Set match_score = match_score +
                              child_match_score
                    Set match_explanation = match_explanation +
                              child_match_explanation
```

-continued

```
          Endif
     End Loop over required child qualities
Return from MatchQualities routine
```

As described above, once the expert system 114 converts the user's questions into required qualities, the associative matching algorithm 120 is called, passing the table of required qualities, the entire list of architectures (Architecture table), and the set of object qualities for each architecture (Architecture Qualities table).

The main routine computes an architecture score for each network architecture based on the match score between each required quality and the corresponding (same quality ID) object qualities of the network architecture. The main routing also sorts the network architectures based on their architecture scores, and finally returns the top N architectures along with their scores and selection explanations. FIG. 9, described below, illustrates a sample screen 900 showing the list 901 of selected network architectures, each with an architecture score 903.

The outer loop in the main routine cycles over the entire set of architectures. The inner loop cycles over the required qualities. If the architecture has an object quality that corresponds to the required quality (based on the same quality ID), then the routine MatchQualities is called. Note that not all qualities from the quality table need appear in the required qualities table nor does each network architecture have a corresponding quality to the required qualities.

MatchQualities performs the computation of the closeness of the match between a required quality and an object quality of an output entity, such as a network architecture. MatchQualities is passed the required quality and the object quality. MatchQualities returns a numeric match score representing the goodness of match and a textual explanation describing the quality or degree of the match (or mismatch). The match score is applied to the overall score for this architecture, and the textual explanation of the match is concatenated to the end of the selection explanation for this architecture.

The MatchQualities routine contains three main branches, only one of which gets executed, depending of the type of the required quality. If a required quality is a symbol quality, then the first branch is executed. In this case the value of the required quality must be an atomic symbol, the value of the object quality is a list of one or more symbols, and the object quality operator is either "in" or "not in". If the matching logic determines that the object quality operator is "in", then the required quality value must be found within the list of object quality values. If the object quality operator is "not in" then the required quality value must not be found within the list of object quality values. Both these cases constitute a match, and the resulting match score is the positive weight of the required quality. If a mismatch is found, the resulting match score is the negative of the required quality weight. The selection explanation is the quality textual description (qualities description attribute of Quality table) appended with the string "matches" or "does not match", as appropriate.

The second branch of the MatchQualities routine contains processing logic for level type qualities. Level qualities are numeric, and the object quality operator consists of one of the numeric comparison operators "=", "!=", ">=", or "<=". The matching logic determines whether the relationship between the object quality and the required quality as specified by the comparison operator is satisfied. For example, if the quality is "criticality level", the required quality value is "3", the object quality value is "4", and its operator is ">=", then the match expression reads:

Architecture X is applicable when "criticality_level" ">=" "4". Since the value of the required quality is "3", a mismatch is found.

For level qualities the selection explanation is formed from the quality textual description appended with a string which is descriptive of the match just like for symbol qualities.

The third branch of the MatchQualities routine contains processing logic for parent qualities. Parent qualities form the branching nodes of the hierarchical quality tree. The main routine only processes qualities at the top level in the hierarchy. When passed a parent quality, the routine MatchQualities loops over all the children qualities within the branch and recursively calls itself to evaluate the match score for each child. The children qualities are either level or symbol qualities (though in other implementation they may be parent qualities for multiple level hierarchies). The score for the parent quality is the summation of match scores for each of the children qualities beneath that parent.

The match score for level qualities may be computed in various ways. In one embodiment, the match score for level quality matches is based on a boolean match operator. Level qualities receive a score of +(weight) for a match and −(weight) for a mismatch. Continuing the previous example, the object quality value and operator (>=4) did not satisfy the required quality (3), so the score is the negative of the weight of the required quality.

In an alternative embodiment using fuzzy logic, the match score is a function of the difference between the quality value of the required quality and the quality value of the network object quality. Preferably, the function multiplies the difference between the quality values by the weight of the required quality, though other functions may be used. For example, if a required quality had a quality value of 5, and a quality weight of 10, and the object quality had a value of 2, and a quality operator of ">=" then there is partial match; the match score is (3−5)*10 or −20.

Table 13 provides a sample of the data generated by the associated matching algorithm 120.

TABLE 13

Example Ranked Architectures

| Architecture Score | Name | Selection Explanation | |
|---|---|---|---|
| 45 | B057: Three-tier clustered DB | System Management Type | matches |
| | | Cost Level | mismatch |
| | | OLTP Transaction Volume Level | matches |
| | | Availability Level | matches |
| | | Data Distribution Level | matches |
| | | Performance Level | matches |
| | | Network Traffic Profile Type | matches |
| | | Legacy System Interface Type | matches |
| 41 | B059: Remote Three-tier clustered DB | System Management Type | matches |
| | | Cost Level | mismatch |
| | | OLTP Transaction Volume Level | matches |
| | | Availability Level | mismatch |
| | | Data Distribution Level | matches |
| | | Performance Level | matches |
| | | Network Traffic Profile Type | matches |
| | | Legacy System Interface Type | mismatch |
| 33 | B045: Remote DB gateway server | System Management Type | matches |
| | | Cost Level | matches |
| | | OLTP Transaction Volume Level | mismatch |
| | | Availability Level | mismatch |

TABLE 13-continued

Example Ranked Architectures

| Architecture Score | Name | Selection Explanation | |
|---|---|---|---|
| | | Data Distribution Level | mismatch |
| | | Performance Level | matches |
| | | Network Traffic Profile Type | matches |
| | | Legacy System Interface Type | matches |
| 31 | B025: Remote Three-tier distributed app | System Management Type | mismatch |
| | | Cost Level | mismatch |
| | | OLTP Transaction Volume Level | matches |
| | | Availability Level | matches |
| | | Data Distribution Level | matches |
| | | Performance Level | mismatch |
| | | Network Traffic Profile Type | mismatch |
| | | Legacy System Interface Type | mismatch |

Each network architecture is identified by its name and has its architecture score. The selection explanation for each quality lists the quality description with the appropriate explanation derived from the match score. This explanation enables to the user to understand the meaning behind the architecture score, and further allows the user to compare the fitness of different architectures to individual qualities. For example, the top ranked network architecture does not fully satisfy the Cost quality, indicating that the cost is too high. The user can then identify the B045: Remote DB gateway server network architecture, which had a lower architecture score of 33, but did fully satisfy the Cost quality. Thus, the user may decide to implement this network architecture should budgetary considerations become predominant.

The selection explanations are different from conventional expert system explanation abilities. Conventionally, expert systems provide explanations that describe only the reasons (i.e. the rules) which caused the final entity to be selected, for example, the rules which fired to determine a diagnosis from a set of symptoms. Because the expert system of the present invention is not used to select the output entities directly, but only the qualities, the selection explanations describe the degree to which a quality was satisfied, and not which rules were invoked to select an entity.

After the associative matching algorithm 120 ranks the scored architectures for the network architecture, the user can review each of the architectures for further information. The user can specify how many (the number N) of the highest-scoring architectures to view, say 5 or 10. The user does not necessarily need to select the highest ranked architecture, as discussed above. As illustrated in FIG. 9, the best N architectures are presented in a list box 901 in order of decreasing rank (905), along with the architecture score 903 for each one. The user can click on one architecture and view the selection explanation 907. The selection explanation 907 indicates the degree of match between the qualities of the selected network architecture and the required qualities. The user may view the architecture diagram by clicking the view architecture button, along with its detailed description, advantages, and disadvantages. After contemplating each of the top architectures, the user may click on one from the list and hit the select architecture button to link this architecture to a project or other files. The selected architecture may be linked to a project simply by inserting its architecture ID into a selected architecture ID field in a row corresponding to the project in a projects table.

In summary, the present invention provides a quality driven expert system that operates to derive a self-describing quality description of a desired output from a set of case specific facts. These qualities are then matched against the qualities of a predefined set of outputs in order to select a number of the outputs that best match the quality description. The present invention may be applied to any variety of application domains where the outputs may be described by a set of qualities, and where a set of rules may be defined to derive required qualities from input facts. One embodiment of the present invention operates in the domain of selecting network architectures for computer networks. Other application domains may be constructed in accordance with the principles of the present invention.

APPENDIX A - LISTING OF NETWORK ARCHITECTURES

| Architecture Name | Architecture Description |
|---|---|
| W000:Remote presentation | Workgroup client/server computing: Client workstations provide only presentation services and logic. All other tasks are performed by the server. |
| W010:Distributed App | Workgroup client/server computing: Business rule processing is distributed between the clients and the server. |
| W015:Three-tier | Workgroup client/server computing: Three-tiered architecture. |
| W020:Remote DB access | Workgroup client/server computing: All computing except database services is performed by the client. |
| W025:DB gateway server | Workgroup client/server computing: All database requests are processed through a centralized database gateway server. |
| W030:Distributed DB | Workgroup client/server computing: Data is distributed between the clients and the server. Some of the data is stored on the database server and other data is stored on the client in a local database. |
| W040:File server | Workgroup client/server computing: Clients perform all computing, including database services. The server provides simple file I/O services. |
| W050:Remote presentation [legacy] | Workgroup client/server computing with legacy data: Client workstations provide only presentation services and logic. All other tasks are performed by the server, which also receives updated data from legacy systems. |
| W060:Distributed App [legacy] | Workgroup client/server computing with legacy data: Application logic is distributed between the clients and the server. |
| W065:Three-tier [legacy] | Workgroup client/server computing with legacy data: Three-tiered architecture. |
| W067:Three-tier hybrid [legacy] | Workgroup client/server computing with legacy system: Three-tiered architecture with the legacy system acts as a database server. |
| W070:Remote DB access [legacy] | Workgroup client/server computing with legacy data: All computing except database services are performed by the clients. |
| W080:Distributed DB [legacy] | Workgroup client/server computing with legacy data: Data is distributed between the clients and the server. Some of the data is stored on the database server and other data is stored on the client in a local database. |
| W090:File server [legacy] | Workgroup client/server computing with legacy data: Clients perform all computing, including database services. The server provides simple file I/O services. |
| W100:Distributed presentation [legacy] | Workgroup client/server computing with legacy system: Old legacy applications are wrapped with new GUI interfaces. Client workstations perform only presentation services while the legacy system processes presentation logic, rule and data services. |
| W103:Legacy transaction [legacy] | Workgroup client/server computing with legacy system: Client workstations perform only presentation services and logic while the legacy system processes all business transactions and data services. |
| W106:DB gateway server [legacy] | Workgroup client/server computing with legacy system: All database requests are processed through a centralized database gateway server. The legacy system services all database requests. |
| C000:Remote presentation | Corporate client/server computing: Client workstations provide only presentation services and logic. All other tasks are performed by the server. |
| C010:Distributed App | Corporate client/server computing: Application logic is distributed between the clients and the server. |
| C020:Three-tier | Corporate client/server computing: Three-tiered architecture. |
| C030:Remote DB access | Corporate client/server computing: All computing except database services are performed by the clients. |
| C040:DB gateway server | Corporate client/server computing: All database requests are processed through a centralized database gateway server. |
| C050:Distributed DB | Corporate client/server computing: Data is distributed across multiple servers. |
| C055:Clustered DB | Corporate client/server computing: Data is shared among a cluster of database servers. |
| C060:Three-tier dist. app. server | Corporate client/server computing: Three-tiered architecture with business rule processing distributed among a cluster of application servers. |
| C065:Three-tier dist. app & DB | Corporate client/server computing: Three-tiered architecture with business rule processing distributed among a cluster of application servers. The data is also distributed across multiple database servers. |
| C067:Three-tier clustered DB | Corporate client/server computing: Three-tiered architecture with data shared among a cluster of database servers. |
| C070:Fault-tolerant system | Corporate client/server computing: A fault-tolerant system provides high availability through redundant network, data and CPU. |
| C080:Distributed presentation [legacy] | Corporate client/server computing with legacy system: Old legacy applications are wrapped with new GUI interfaces. Client workstations perform only presentation services while the legacy system processes presentation logic, rule and data services. |
| C085:Legacy transaction [legacy] | Corporate client/server computing with legacy system: Client workstations perform only presentation services and logic while the legacy system processes all business transactions and data services. |
| C090:Remote presentation [legacy] | Corporate client/server computing with legacy data: Client workstations provide only presentation services and logic. All other tasks are performed by the server, which also receives updated data from legacy systems. |
| C100:Distributed App [legacy] | Corporate client/server computing with legacy data: Application logic is distributed between the clients and the server. |
| C110:Three-tier [legacy] | Corporate client/server computing with legacy data: Three-tiered architecture. |
| C115:Three-tier hybrid [legacy] | Corporate client/server computing with legacy system: Three-tiered architecture with the legacy system acts as a database server. |
| C117:Three-tier hybrid dist. app [legacy] | Corporate client/server computing with legacy system: Three-tiered architecture with the legacy system acts as a database server. The business rule processing is distributed among a cluster of application servers. |
| C120:Remote DB access [legacy] | Corporate client/server computing with legacy data: All computing except database services are performed by the clients. |
| C130:DB gateway server [legacy] | Corporate client/server computing with legacy system: All database requests are processed through a centralized database gateway server. The legacy system services all database requests. |
| C140:Distributed DB [legacy] | Corporate client/server computing with legacy data: Data is distributed across multiple servers. |
| C145:Clustered DB [legacy] | Corporate client/server computing with legacy data: Data is shared among a cluster of database |

APPENDIX A - LISTING OF NETWORK ARCHITECTURES

| Architecture Name | Architecture Description |
|---|---|
| C150:Three-tier dist. app. server [legacy] | Corporate client/server computing with legacy data: Three-tiered architecture with business rule processing distributed among a cluster of application servers. |
| C155:Three-tier dist. app & DB [legacy] | Corporate client/server computing with legacy data: Three-tiered architecture with business rule processing distributed among a cluster of application servers. The data is also distributed across multiple database servers. |
| C157:Three-tier clustered DB [legacy] | Corporate client/server computing with legacy data: Three-tiered architecture with data shared among a cluster of database servers. |
| C160:Data warehouse [legacy] | Corporate client/server computing with legacy data: The legacy data is reconfigured and aggregated into an integrated central data repository. |
| C163:Data mart [legacy] | Corporate client/server computing with legacy data: The legacy data is reconfigured and aggregated into one or more line-of-business data mart servers. |
| C166:Hybrid Data warehouse [legacy] | Corporate client/server computing with legacy data: The legacy data is reconfigured and aggregated into an integrated central data repository. The data from the repository is further aggregated into specialized data mart servers. |
| C170:Fault-tolerant system [legacy] | Corporate client/server computing with legacy data: A fault-tolerant system provides high availability through redundant network, data and CPU. |
| B000:Distributed App | Branch office client/server computing: Application logic is distributed between the clients and the server. |
| B005:Remote presentation | Branch office client/server computing: Client workstations provide only presentation services and logic. All other tasks are performed by the server. |
| B010:Three-tier | Branch office client/server computing: Three-tiered architecture with local application server. |
| B020:Remote Three-tier | Branch office client/server computing: Three-tiered architecture with remote application server. |
| B025:Remote Three-tier dist app | Branch office client/server computing: Three-tiered architecture with business rule processing distributed among a cluster of remote application servers. |
| B030:Remote DB access | Branch office client/server computing: All computing except database services are performed by the clients. |
| B040:DB gateway server | Branch office client/server computing: All database requests for a branch office are processed through a local database gateway server. |
| B045:Remote DB gateway server | Branch office client/server computing: All database requests are processed through a centralized remote database gateway server. |
| B050:Distributed DB | Branch office client/server computing: Data is distributed across local and remote database servers. |
| B055:Clustered DB | Branch office client/server computing: Data is shared among a cluster of remote database servers. |
| B057:Three-tier clustered DB | Branch Office client/server computing: Three-tiered architecture with data shared among a cluster of remote database servers. |
| B059:Remote Three-tier clustered DB | Branch office client/server computing: Three-tiered architecture with business rule processing distributed among a cluster of remote application servers. The data is also distributed across multiple remote database servers. |
| B060:Fault-tolerant system | Branch office client/server computing: A fault-tolerant system provides high availability through redundant network, data and CPU. |
| B070:Distributed presentation [legacy] | Branch office client/server computing with legacy system: Old legacy applications are wrapped with new GUI interfaces. Client workstations perform only presentation services while the legacy system processes presentation logic, rule and data services. |
| B075:Legacy transaction [legacy] | Branch office client/server computing with legacy system: Client workstations perform only presentation services and logic while the legacy system processes all business transactions and data services. |
| B080:Distributed App [legacy] | Branch office client/server computing with legacy data: Application logic is distributed between the clients and the server. |
| B090:Three-tier [legacy] | Branch office client/server computing with legacy data: Three-tiered architecture with local application servers. |
| B095:Three-tier hybrid [legacy] | Branch office client/server computing with legacy system: Three-tiered architecture with local application servers and the legacy system acting as a database server. |
| B100:Remote Three-tier [legacy] | Branch office client/server computing with legacy data: Three-tiered architecture with remote application server. |
| B103:Remote Three-tier dist app [legacy] | Branch office client/server computing with legacy data: Three-tiered architecture with business rule processing distributed among a cluster of remote application servers. |
| B105:Remote Three-tier hybrid [legacy] | Branch office client/server computing with legacy system: Three-tiered architecture with remote application server and the legacy system acting as a database server. |
| B107:Remote Three-tier hybrid dist app [legacy] | Branch office client/server computing with legacy system: Three-tiered architecture with the legacy system acts as a database server. The business rule processing is distributed among a cluster of remote application servers. |
| B110:Remote DB access [legacy] | Branch office client/server computing with legacy data: All computing except database services are performed by the clients. |
| B120:DB gateway server [legacy] | Branch office client/server computing with legacy system: All database requests for a branch office are processed through a local database gateway server. The legacy system services all database requests. |
| B125:Remote DB gateway server [legacy] | Branch office client/server computing with legacy system: All database requests are processed through a centralized remote database gateway server. The legacy system services all database requests. |
| B130:Distributed DB [legacy] | Branch office client/server computing with legacy data: Data is distributed across local and remote database servers. |
| B135:Clustered DB [legacy] | Branch office client/server computing with legacy data: Data is shared among a cluster of remote database servers. |
| B137:Three-tier clustered DB [legacy] | Branch office client/server computing with legacy data: Three-tiered architecture with data shared among a cluster of remote database servers. |
| B139:Remote Three-tier clustered DB [legacy] | Branch office client/server computing with legacy data: Three-tiered architecture with business rule processing distributed among a cluster of remote application servers. The data is also distributed across multiple remote database servers. |
| B140:Data mart [legacy] | Branch office client/server computing with legacy data: The legacy data is reconfigured and aggregated into one or more line-of-business data mart servers. |
| B150:Data warehouse [legacy] | Branch office client/server computing with legacy data: The legacy data is reconfigured and aggregated into an integrated central data repository. |
| B153:Hybrid data warehouse [legacy] | Branch office client/server computing with legacy data: The legacy data is reconfigured and aggregated into an integrated central data repository. The data from the repository is further aggregated into specialized data mart servers. |

APPENDIX A - LISTING OF NETWORK ARCHITECTURES

| Architecture Name | Architecture Description |
| --- | --- |
| B160:Fault-tolerant system [legacy] | Branch office client/server computing with legacy data: A fault-tolerant system provides high availability through redundant network; data and CPU. |
| E000:Remote presentation | Enterprise client/server computing: Client workstations provide only presentation services and logic. All other tasks are performed by the server. |
| E010:Distributed App | Enterprise client/server computing: Application logic is distributed between the clients and the server. |
| E020:Three-tier | Enterprise client/server computing: Three-tiered architecture. |
| E030:Remote DB access | Enterprise client/server computing: All computing except database services are performed by the clients. |
| E040:DB gateway server | Enterprise client/server computing: All database requests are processed through a database gateway server. |
| E050:Distributed DB | Enterprise client/server computing: Data is distributed across multiple servers. |
| E055:Clustered DB | Enterprise client/server computing: Data is shared among a cluster of database servers. |
| E060:Three-tier dist. app. server | Enterprise client/server computing: Three-tiered architecture with business rule processing distributed among a cluster of application servers. |
| E065:Three-tier dist. app & DB | Enterprise client/server computing: Three-tiered architecture with business rule processing distributed among a cluster of application servers. The data is also distributed across multiple database servers. |
| E067:Three-tier clustered DB | Enterprise client/server computing: Three-tiered architecture with data shared among a cluster of database servers. |
| E070:Fault-tolerant system | Enterprise client/server computing: A fault-tolerant system provides high availability through redundant network, data and CPU. |
| E080:Distributed presentation [legacy] | Enterprise client/server computing with legacy system: Old legacy applications are wrapped with new GUI interfaces. Client workstations perform only presentation services while the legacy system processes presentation logic, rule and data services. |
| E085:Legacy transaction | Enterprise client/server computing with legacy system: Client workstations perform only presentation services and logic while the legacy system processes all business transactions and data services. |
| E090:Remote presentation [legacy] | Enterprise client/server computing with legacy data: Client workstations provide only presentation services and logic. All other tasks are performed by the server, which also receives updated data from legacy systems. |
| E100:Distributed App [legacy] | Enterprise client/server computing with legacy data: Application logic is distributed between the clients and the server. |
| E110:Three-tier [legacy] | Enterprise client/server computing with legacy data: Three-tiered architecture. |
| E115:Three-tier hybrid [legacy] | Enterprise client/server computing with legacy system: Three-tiered architecture with the legacy system acts as a database server. |
| E117:Three-tier hybrid dist. app [legacy] | Enterprise client/server computing with legacy system: Three-tiered architecture with the legacy system acts as a database server. The business rule processing is distributed among a cluster of application servers. |
| E120:Remote DB access [legacy] | Enterprise client/server computing with legacy data: All computing except database services are performed by the clients. |
| E130:DB gateway server [legacy] | Enterprise client/server computing with legacy system: All database requests are processed through a centralized database gateway server. The legacy system services all database requests. |
| E140:Distributed DB [legacy] | Enterprise client/server computing with legacy data: Data is distributed across multiple servers. |
| E145:Clustered DB [legacy] | Enterprise client/server computing with legacy data: Data is shared among a cluster of database servers. |
| E150:Three-tier dist. app. server [legacy] | Enterprise client/server computing with legacy data: Three-tiered architecture with business rule processing distributed among a cluster of application servers. |
| E155:Three-tier dist. app & DB [legacy] | Enterprise client/server computing with legacy data: Three-tiered architecture with business rule processing distributed among a cluster of application servers. The data is also distributed across multiple database servers. |
| E157:Three-tier clustered DB [legacy] | Enterprise client/server computing with legacy data: Three-tiered architecture with data shared among a cluster of database servers. |
| E160:Data warehouse [legacy] | Enterprise client/server computing with legacy data: The legacy data is reconfigured and aggregated into an integrated central data repository. |
| E163:Data mart [legacy] | Enterprise client/server computing with legacy data: The legacy data is reconfigured and aggregated into one or more line-of-business data mart servers. |
| E166:Hybrid Data warehouse [legacy] | Enterprise client/server computing with legacy data: The legacy data is reconfigured and aggregated into an integrated central data repository. The data from the repository is further aggregated into specialized data mart servers. |
| E170:Fault-tolerant system [legacy] | Enterprise client/server computing with legacy data: A fault-tolerant system provides high availability through redundant network, data and CPU. |
| I000:Single-Tier Info Service | Internet computing: Single-tier information services. The information is stored as HTML documents and other static file types and presented to the users directly through Web browsers. |
| I010:Two-Tier Info Service | Internet computing: Two-tier information services. The information is stored in a database server and is retrieved when the user makes a request through a Web browser. |
| I020:Three-Tier Info Service | Internet computing: Three-tier information services. The information is retrieved from a database and is processed through a set of server-side business rules before it is presented to the users. |
| I030:Client-Centric Single-Tier Info Service | Internet computing: Client-centric single-tier information services. The client Web browser executes scripts (applets) downloaded from the server. |
| I040:Client-Centric Two-Tier Info Service | Internet computing: Client-centric two-tier information services. The client Web browser executes scripts (applets) downloaded from the server. The scripts retrieves information from the back-end database server. |
| I050:Distributed Three-Tier Info Service | Internet computing: Distributed three-tier information services. The client Web browser executes scripts (applets) downloaded from the server. The business rules are distributed between the browser scripts and back-end server. |
| T000:Single-Tier Info Service | Intranet computing: Single-tier information services. The information is stored as HTML documents and presented to the users directly through Web browsers. |
| T010:Two-Tier Info Service | Intranet computing: Two-tier information services. The information is stored in a database server and is retrieved when the user makes a request through a Web browser. |
| T020:Three-Tier Info Service | Intranet computing: Three-tier information services. The information is retrieved from a database and is processed through a set of server-side business rules before it is presented to the users. |
| T030:Client-Centric Single-Tier Info Service | Intranet computing: Client-centric single-tier information services. The client Web browser executes scripts (applets) downloaded from the server. |

APPENDIX A - LISTING OF NETWORK ARCHITECTURES

| Architecture Name | Architecture Description |
| --- | --- |
| T040:Client-Centric Two-Tier Info Service | Intranet computing: Client-centric two-tier information services. The client Web browser executes scripts (applets) downloaded from the server. The scripts retrieves information from the back-end database server. |
| T050:Distributed Three-Tier Info Service | Intranet computing: Distributed three-tier information services. The client Web browser executes scripts (applets) downloaded from the server. The business rules is distributed between the browser scripts and back-end server. |
| NW000:ThinWire Ethernet LAN | Low speed thinwire 10Base2 Ethernet LAN with bus topology. |
| NW010:10BaseT Ethernet LAN | Low speed 10Base-T Ethernet LAN connected by Ethernet hubs. |
| NW020:Token Ring LAN | Low speed token ring LAN connected by token ring hubs. |
| NW030:Wireless LAN | Low speed wireless LAN for desktop and mobile computers. |
| NW040:ARCnet LAN | Low speed and low cost peer-to-peer LAN. |
| NW050:100BaseT LAN | High speed 100Base-T 100Mbps Ethernet LAN. |
| NW060:100VG-AnyLAN | High speed 100VG-AnyLAN 100Mbps Ethernet LAN. |
| NW070:Switched Ethernet LAN | High Speed switched 10Base-T 10Mbps LAN. |
| NW080:Switched Token Ring LAN | High Speed switched Token Ring 4/16 Mbps LAN. |
| NW082:100BaseT Fiber Optic LAN | High speed 100Base-T 100Mbps Fast Ethernet LAN with fiber optic cables. |
| NW084:Switched 100BaseT Fiber Optic LAN | High speed switched 100Base-T 100Mbps Fast Ethernet LAN with fiber optic cables. |
| NW086:Switched 100BaseT Ethernet LAN | High speed switched 100Base-T 100Mbps Fast Ethernet LAN. |
| NW090:Switched 10/100BaseT Ethernet | High speed switched 10/100Base-T Fast Ethernet LAN. |
| NW100:Switched 10BaseT with Fiber Optic | High speed switched 10/100Base-T Fast Ethernet LAN with fiber optic cables. |
| NW105:ATM LAN | High speed Asynchronous Transfer Mode LAN. |
| NC000:Simple Fast Ethernet | Simple Fast Ethernet backbone connected by category 5 UTP or fiber optic cable. |
| NC010:FDDI Backbone | Fiber Distributed Data Interface (FDDI) backbone running at 100Mbps. |
| NC020:FDDI/ Central Admin | Fiber Distributed Data Interface (FDDI) backbone running at 100Mbps with a centralized administration configuration. |
| NC050:FDDI with Switches | Fiber Distributed Data Interface (FDDI) Backbone with Switches. |
| NC060:FDDI with Switches/ Central Admin | Fiber Distributed Data Interface (FDDI) backbone and switches with centralized administration configuration. |
| NC090:ATM with Fiber Optic | ATM backbone switches with fiber optic links. |
| NC100:ATM with Fiber Optic/ Central Admin | ATM backbone switches and fiber optic links with centralized administration configuration. |
| NC125:Switched Backbone | Switched 100Mbps Ethernet Backbone. |
| NC130:Switched Backbone/ Central Admin | Switched 100Mbps Ethernet backbone with centralized administration configuration. |
| NC145:ATM Backbone | ATM (Asynchronous Transfer Mode) backbone. |
| NC150:ATM Backbone/ Central Admin | ATM Backbone with centralized administration configuration. |
| NC180:Centralized Wireless LAN | Centralized wireless LAN backbone. |
| NC190:Multi-point Wireless LAN | Multi-point wireless LAN backbone. |
| NB000:Switched | Low speed branch office communication through |
| Circuit: PSTN | PSTN. |
| NB005:Dedicated/ Leased Circuit | High speed point-to-point branch office communication through dedicated/leased circuit. |
| NB010:ISDN-BRI | Branch office communication through ISDB-BRI (Basic Rate Interface). |
| NB015:ISDN-PRI | Branch office communication through ISDN-PRI (Primary Rate Interface). |
| NB020: X.25 | Low speed branch office communication through switched network -X.25. |
| NB030:Frame Relay | High speed branch office communication through packed switched network - Frame Relay. |
| NB040:ATM | High speed branch office communication through public ATM. |
| NB050:Satellite Communication | Low speed branch office communication through satellites. |
| NB060:Internet | Secured branch office communication through the Internet (Virtual Private Network). |
| NB105:Dedicated Circuit with Redundancy | High speed point-to-point branch office. communication through dedicated/leased circuit with redundant links through PSTN. |
| NB110:ISDN-BRI with Redundancy | Branch office communication through redundant ISDB-BRI (Basic Rate Interface) links. |
| NB115:ISDN-PRI with Redundancy | Branch office communication through redundant ISDB-PRI (Primary Rate Interface) links. |
| NB120:X.25 with Redundancy | Low speed branch office communication through switched network -X.25 with redundant PSTN links. |
| NB130:Frame Relay with Redundancy | High speed branch office communication through packed switched network - Frame Relay with redundant ISDN links. |
| NB140:ATM with Redundancy | High speed branch office communication through public ATM with redundant T1 links. |
| NB150:Satellite with Redundancy | Low speed branch office communication through satellites with redundant PSTN links. |
| NB160:Internet with Redundancy | Secured branch office communication through the Internet (Virtual Private Network) with redundant ISDN links. |
| NE000:Enterprise Routing | Classical enterprise networking with a centralized router in a collapsed backbone configuration. |
| NE010:Distributed Routing | Classical enterprise networking with interconnecting routers forming a backbone. |
| NE020:Distributed Routing with FDDI | Classical enterprise networking with interconnected routers and FDDI as the backbone. |
| NE030:Hierarchical Switches | Switch-based enterprise networking with hierarchical switches. |
| NE040:Distributed Switches | Switch-based enterprise networking with interconnecting switches forming a backbone. |
| NE045:Switches with FDDI | Switch-based enterprise networking with interconnecting switches and FDDI as the backbone. |
| NE050:Switches with Centralized Router | Switch-based enterprise networking with a centralized router. |
| NE060:Switches with Distributed Routers | Switch-based enterprise networking with a centralized switch and distributed routers. |
| NE075:ATM with Hierarchical Switches | ATM-based enterprise networking with hierarchical switches. |
| NE080:End-To-End ATM with Hierarchical Switches | End-To-End ATM networking with hierarchical ATM switches. |
| NE085:ATM with Distributed Switches | ATM-based enterprise networking with interconnecting ATM switches forming a backbone. |
| NE090:End-To-End ATM with Distributed Switches | End-To-End ATM networking with interconnecting ATM switches forming a backbone. |
| NE092:ATM with FDDI | ATM-based enterprise networking with interconnecting ATM switches and FDDI as the backbone. |
| NE095:End-To-End ATM with FDDI | End-To-End ATM networking with interconnecting ATM switches and FDDI as the backbone. |
| NE097:ATM with Centralized Router | ATM-based enterprise networking with a centralized router. |
| NE100:End-To-End ATM with Centralized | End-To-End ATM networking with a centralized router. |

APPENDIX A - LISTING OF NETWORK ARCHITECTURES

| Architecture Name | Architecture Description |
|---|---|
| Router | |
| NE105:ATM with Distributed Routers | ATM-based enterprise networking with a centralized ATM switch and distributed routers. |
| NE110:End-To-End ATM with Distributed Routers | End-To-End ATM networking with a centralized ATM switch and distributed routers. |
| NE115:ATM with Redundant FDDI | ATM-based enterprise networking with a redundant FDDI backbone. |
| NE120:End-To-End ATM with Redundant FDDI | End-To-End ATM networking with a redundant FDDI backbone. |
| NR000:Remote Access via PSTN | Remote access to corporate network via Public Switched Telephone Network (PSTN). |
| NR010:Remote Access via ISDN-BRI | Remote access to corporate network via ISDN-BRI (Basic Rate Interface). |
| NR020:Remote Access via Internet | Remote access to corporate network via the Internet. |
| NR030:Remote Control via PSTN | Remote access to corporate network via PSTN using remote control software to communicate with host PC. |
| NR040:Remote Control via ISDN-BRI | Remote access to corporate network via ISDN-BRI using remote control software to communicate with the host PC. |
| NI000:Router-Based External Web | Internet networking with router-based external Web service. |
| NI010:Router-Based Internal Web | Internet networking with router-based internal Web service. |
| NI020:Dual-Homed External Web | Internet networking with dual-homed external Web service. |
| NI030:Dual-Homed Internal Web | Internet networking with dual-homed internal Web service. |
| NI040:Dual-Homed Hybrid Web | Internet networking with dual-homed hybrid Web service. |
| NI050:Screened-Host Gateway | Internet networking with screened-host gateway Web service. |
| NI060:Screened Router-Based Subnet | Internet networking with screened router-based subnet Web service. |
| NI070:Screened Gateway-Based Subnet | Internet networking with screened gateway-based subnet Web service. |
| NI080:Stand-Alone Router-Based | Internet networking with stand-alone router-based Web service. |
| NI090:Stand-Alone Dual-Homed | Internet networking with Stand-alone dual-homed Web service. |
| NT000:Unsecured Web | Intranet networking with unsecured Web service. |
| NT010:Router-Based Web | Intranet networking with router-based Web service. |
| NT020:Dual-Homed Web | Intranet networking with dual-homed Web service. |
| NT030:Dual-Homed Hybrid Web | Intranet networking with dual-homed hybrid Web service. |
| NT040:Screened-Host Gateway Web | Intranet networking with screened-host gateway Web service. |

APPENDIX B - EXAMPLES OF ARCHITECTURE DESCRIPTIONS

| Arch. ID | Desc. Type | Architecture Description |
|---|---|---|
| 12000 | Minus | The primary problem with this architecture is that it can only support a very limited number of users. Because the entire network is a single LAN segment, traffic congestion in one department affects all other departments. Broadcast messages from a server can cause network congestion for the entire LAN. |
| 12000 | Plus | This architecture is one of the simplest corporate backbone structure to implement. It requires very little setup and configuration. It is also a low cost solution for connecting departmental LANs. |
| 12000 | Long | This architecture utilizes simple fast ethernet connections as a backbone linking hubs together. The hub connection can use either category 5 UTP (unshielded twisted pair) or fiber optic cable. This architecture is suitable for a small company or organization where each department's computers are attached to a hub. The hubs are daisy chained by fast ethernet connections. The entire network forms a single LAN segment. |
| 12130 | Minus | The collapsed backbone configuration tends to utilize much more cable than other configurations. The cable also has a distance limitation. Workgroups that are far apart may not be able to connect to the hub. Finally, the hub becomes a single point of failure for the entire network. Switches can be expensive and they add to network overhead. A switch is also an additional device on the network which must be maintained, and which can possibly be a point of failure or network problems. Switches cannot solve all the network problems. If an application requires higher speed network access than the current LAN bandwidth limitation, you will have to upgrade to a higher speed LAN protocol. Because switches generally operate at the data-link protocol layer, it cannot filter out broadcast messages. A single broadcast message can cause the switch to transmit the message to all connected hosts, thereby creating network delays. In general, switches can only be scaled to over a few hundred host connections. The communication delay between a server and its clients may increase because servers are not localized to the individual workgroup that utilize them. |
| 12130 | Plus | The collapsed backbone architecture concentrates the majority of critical network components in a single box thereby simplifying network administration. The high speed backplane in the backbone hub can operate at a much higher bandwidth than normal LAN protocol. Switches reduce packet collisions and contentions in a congested network by microsegmenting the LAN. One of the fastest and most economical ways of upgrading the performance of a network is to replace a hub with a switch. This modification requires no change to the underlying cabling structure and provides instant relief. Centralized administration allows for simplified maintenance of the system. Hardware and resources are placed in the same physical location. System problems can be serviced faster because personnel are normally in close proximity to the equipment. Trained personnel are always nearby to perform hardware and software enhancements, and improve performance optimization. Additionally the servers enjoy greater security because a single security standard can be applied to all of the servers. |
| 12130 | Long | This architecture utilizes a single switching hub in a collapsed backbone configuration. The servers are centrally administered in a server farm. The collapsed backbone configuration utilizes a single switching or routing hub as the central wiring concentrator. The hub usually contains a high speed backplane that allows multiple hub modules to communication with each other. Switches are devices that can reduce collisions and contentions among shared network topologies by reducing the number of nodes on a segment using microsegmentation techniques. On a micro-segmented network, a local area network (LAN) segment can have just one node. The switch then handles all the connections between nodes on different LAN segments. With switching tech- |

APPENDIX B - EXAMPLES OF ARCHITECTURE DESCRIPTIONS

| Arch. ID | Desc. Type | Architecture Description |
|---|---|---|
| | | nology LANs can be segmented, with the switch handling traffic between segments much like a bridge, but without the slower throughput of a bridge. |
| | | The centralized administration architecture places critical corporate servers in a central location known as a server farm. The servers are managed and backed up by a team of maintenance staff. To reduce network bottleneck, the servers have a dedicated high speed connection to the corporate backbone. |
| 14000 | Minus | This architecture works well only when there is not too much internetwork traffic. In a dynamic environment where the users' computing needs require access to other department's servers, the central router may be overloaded and become the critical bottleneck. Furthermore, if the central router fails, the enterprise becomes segmented. This architecture requires a large amount of cabling to connect all the LANs to a single router. The physical cable limitation may make this architecture unsuitable for metropolitan networks. |
| 14000 | Plus | This configuration is highly scalable. New LAN segments can be attached to the central router easily. The underlying technology is stable and time tested. Internetwork packets from one host to another only need to pass through a single router, therefore there are no packet delays caused by multiple router hops. |
| 14000 | Long | This architecture utilizes a central router to connect all the departmental LANs and WANs into an enterprise network. In this configuration the router isolates all the network traffic for a department locally while it routes inter-departmental packets from one LAN segment to another. The central router does not usually connect directly to the end-users. Rather, the router connects to department level switches or routers via high speed links such as 100Base-T. The central router may also connect with the corporate server farm, thus providing high speed access to these servers. |
| 16020 | Minus | Proxies require the clients to be enabled for proxying. In the case of Netscape, it is simply a matter of inputting the IP addresses of the proxies into your user preferences. In the case of SOCKS, however, this means re-compiling the source code for the clients to use SOCKS socket libraries in place of standard sockets libraries. The proxy server may become a major bottleneck for the system, as all traffic must pass through it to get to the LAN. |
| 16020 | Plus | Internet users can access your services without having to pass through the application gateway (proxy server), yet will be prevented by the proxy server from accessing your LAN. LAN users can get easy access to the Internet and the corporate Web server. |
| 16020 | Long | Hosts connecting to your Web server from the Internet hit the Web and other Internet servers directly. As the dual-homed host has two network interface cards (NICs) separated from one another, traffic is restricted based upon application gateway software. This architecture is primarily geared towards having your Internet services made available to the public, while only allowing traffic to come from the LAN, not directly to it. This is enabled by the way the proxy works: the proxy server will take a request for a specific service, replace the requesting host's name with its own, and forward the revised request to the intended host. The server now thinks that the proxy is |

APPENDIX B - EXAMPLES OF ARCHITECTURE DESCRIPTIONS

| Arch. ID | Desc. Type | Architecture Description |
|---|---|---|
| | | the requester, and knows nothing about the host which made the initial request, thus the server's reply can only be sent to the proxy, not to the actual client sitting on the LAN. |

APPENDIX C—LISTING OF QUESTIONS FOR ARCHITECTURE ADVISOR

Questions asked by the Architecture Advisor are listed below. One or more questions are grouped under the section heading in which they appear, and the list of possible responses for each question is shown.

Note that the user is not asked all possible questions because the expert system provides "question branching". Depending on the answer to certain questions, "question branching" takes place, and subsequent questions are asked depending on prior answers. For example, in the "Objective" section, the user is asked what kind of network needs to be configured (i.e., workgroup, corporate, branch office, enterprise, remote users, or web site). The next set of questions will then depend on the answer, e.g., the "Workgroup" section, "Corporate" section, "Branch Office" section, and so forth, will then be asked. Within a given section, however, all questions will be asked.

Format of Listing

The format for listing the questions and possible responses is

Section Name 1
  Question 1
    Possible response 1
    Possible response 2
    ...
  Question 2
    ...
Section Name 2
  Question 1
    ...

QUESTIONS ASKED BY ARCHITECTURE ADVISOR

Objective Section
Question 1
What type of network do you need to configure? (choose one)
  Workgroup LAN
  Corporate backbone
  Branch office
  Enterprise network
  Remote users
  World Wide Web service
  Data Warehouse
Question 2
What is the most critical success factor for building the network? (choose one)
  Cost optimization
  Reliability and cost
  Management and security Performance optimization Scalability Question 3

What is the NEXT most critical success factor for building the network? (choose one)

Cost optimization

Reliability and cost

Management and security

Performance optimization

Scalability

Question 4

Do you expect your network to be more user-intensive or bandwidth-intensive? (choose one)

User-intensive

Bandwidth-intensive

Both

Neither

Workgroup Networking Section

Question 1

Do you have a LAN strategy that you need to preserve? (choose one)

Ethernet

Token Ring

ARCnet

No

Question 2

Do you want to build a wireless LAN for mobile users? (choose one)

Yes

No

Question 3

What is the primary type of LAN usage for this workgroup? (choose one)

File services

Database services

Multimedia and imaging

Video conferencing

Question 4

What is the total number of nodes that will be attached to the network? (choose one)

Less than 10

Between 10 and 50

Between 50 and 100

Greater than 100

Corporate networking

Question 1

Do you want to manage the corporate servers centrally?

Yes

No

Question 2

Do you want to manage the critical network components centrally?

Yes

No

Question 3

Are you planning a land-based corporate backbone or do you need to configure a wireless backbone?

Land-based

Wireless

Question 4

What is the geographic configuration of your planned corporate network?

Single corporate building

Local buildings

Metropolitan buildings

Question 5

What is the total number of nodes that will be attached to the corporate network?

Less than 100

Between 100 and 500

Between 500 and 1000

Greater than 1000

Branch office

Question 1

How many branch offices will be participating in the network architecture?

Less than 10

10—100

Greater than 100

Question 2

What are the bandwidth requirements for branch office communication?

56K bps or less

Between 56K and 1.5M bps

Greater than 1.5M bps

Unknown

Question 3

What type of connectivity will the branch offices require?

Multipoint connectivity

Headquarters only

Question 4

What frequency of access do you expect the branch offices will require for communications across the wide area network?

Frequent

Occasional

Question 5

What type of data do you want to optimize the branch office wide area network for?

Data—Terminal emulation

Data—File transfer

Data—Client/Server

Data and voice

Multimedia

Question 6

Do you want to install redundant WAN links for fault tolerance?

Yes

No

Enterprise

Question 1

Do you want to preserve an existing network

FDDI backbone

Distributed Router/bridge

Collapsed backbone

Other types

No

Question 2

Do you want to optimize your network to allow for the flexible reorganization of end-user workgroups?

Yes

No

Question 3

Do you need to deliver advanced network capabilities to the end users?
    Multimedia or imaging
    Video conferencing
    No
Remote Access
Question 1
What is the primary type of network usage for the remote users?
    Terminal services
    File services
    Client/Server services
    Application services
    Multimedia/imaging/video
Question 2
Do the users need to run programs that require intensive processing or disk I/O?
    Yes—all the time
    Yes—sometimes
    No
Internet
Question 1
Do you want to build a Web site for public access, internal corporate access, or both?
    Internal only
    Public only
    Both
Question 2
In what order do you want to optimize on security, performance and cost?
    Security—cost—performance
    Security—performance—cost
    Performance—cost—security
    Performance—security—cost
    Cost—performance—security
    Cost—security—performance
Internet security
Question 1
What type of external public users will be accessing the Web service?
    General public
    Special subscription users
    Both
Question 2
What part of your network do you want to secure against intrusion?
    Corporate LAN
    Web servers
    Both
Intranet security
Question 1
What level of Internet security do you want to impose for the internal Web users?
    High
    Medium
    Low
Data Warehouse Section
Question 1.
What type of organization will utilize the data warehouse? (choose one)
    Work Group
    Corporate
    Branch Office
    Enterprise
Question 2.
What kind of queries and reports need to be supported? (choose any number)
    trend analysis on product, sales, and events
    analysis of financial information
    exception reporting
    budgeting, planning, and forecasting
Question 3.
What is the length of time you have to complete the project? (choose one)
    1 to 2 months
    2 to 6 months
    6 to 12 months
    Greater than 1 year
Question 4.
What query performance will be acceptable to the users? (choose one)
    Under 10 seconds
    10 seconds to 1 minute
    Between 1 and 5 minutes
    Greater than 5 minutes
Question 5.
What are your growth requirements over the anticipated lifetime of the system? (choose one)
    Less than 50% growth
    Between 50% and 100% growth
    Between 100% and 200% growth
    Over 200% growth
Question 6.
Do you want to utilize your existing corporate database technology in your data warehouse? (choose one)
    Yes
    No
    Don't care
Question 7.
What are the data capacity requirements? (choose one)
    1 Gigabyte or less
    1 to 20 Gigabytes
    20 to 100 Gigabytes
    100 Gigabytes or greater
Question 8.
How current does the underlying data in the data warehouse need to be? (choose one)
    The data in the data warehouse must instantly reflect changes in the underlying business data
    Refresh several times daily
    Refresh nightly
    Refresh weekly
Question 9.
What is the most critical success factor for the data warehouse project? (choose one)
    Cost
    Performance
    Anticipated growth
    Ease of use
    Ease of administration
Question 10.
Who will be using the system? (choose any number)

Senior corporate management
Business managers
Technical managers
Support staff

APPENDIX D—EXAMPLE OF DETERMINATION OF REQUIRED QUALITIES

Section 1. User Questionnaire

A set of questions with the possible responses is shown below. A user's sample answers are shown with an arrow. The facts that are loaded into the fact list, depending on the user's selected answers, is then listed. The hierarchical nature of the questions is also illustrated, with only those questions being asked that pertain to previous answers.

Question 1. Organization

What type of organization will utilize the data warehouse? (choose one)

- Work Group
- Corporate
- Branch Office
- Enterprise           ← User Answer

Question 2. Queries and Reports

What kind of queries and reports need to be supported? (choose any number)

- trend analysis on product, sales, and events   ←
- analysis of financial information              ←
- exception reporting
- budgeting, planning, and forecasting Question 3. Project Schedule What is the length of time you have to complete the project? (choose one)

- 1 to 2 months
- 2 to 6 months     ←
- 6 to 12 months
- Greater than 1 year

Question 4. Desired Performance

What query performance will be acceptable to the users? (choose one)

- Under 10 seconds     ←
- 10 seconds to 1 minute
- Between 1 and 5 minutes
- Greater than 5 minutes Question 5. Growth Requirements What are your growth requirements over the anticipated lifetime of the system? (choose one)

- Less than 50% growth
- Between 50% and 100% growth     ←
- Between 100% and 200% growth
- Over 200% growth Question 6. Existing Database Do you want to utilize your existing corporate database technology in your data warehouse? (choose one)

- Yes
- No
- Don't care     ←

Question 7. Data Capacity

What are the data capacity requirements? (choose one)

- 1 Gigabyte or less
- 1 to 20 Gigabytes
- 20 to 100 Gigabytes     ←
- 100 Gigabytes or greater Question 8. Data Refresh Rate How current does the underlying data in the data warehouse need to be? (choose one)

- The data in the data warehouse must instantly reflect changes in the underlying business data
- Refresh several times daily     ←
- Refresh nightly
- Refresh weekly Question 9. Critical Success Factor What is the most critical success factor for the data warehouse project? (choose one)

- Cost
- Performance
- Anticipated growth     ←
- Ease of use
- Ease of administration Question 10. Typical Users Who will be using the system? (choose any number)

- Senior corporate management     ←
- Business managers
- Technical managers
- Support staff Fact List Based On User's Sample Answers Table D-1 provides the fact list of (attribute, value) pairs derived from the user's answers.

TABLE D-1

Sample Fact List

| Attribute | Value |
| --- | --- |
| "FACT_ORGANIZATION" | "ENTERPRISE" |
| "FACT_QUERY_TYPE" | "TRENDING" |
| "FACT_QUERY_TYPE" | "FINANCIAL" |
| "FACT_SCHEDULE" | "HALF_YEAR" |
| "FACT_PERFORMANCE" | "VERY_FAST" |
| "FACT_GROWTH" | "MEDIUM" |
| "FACT_CORP_RDBMS" | "DONT_CARE" |
| "FACT_CAPACITY" | "LARGE" |
| "FACT_DATA_REFRESH" | "HOURLY" |
| "FACT_SUCCESS_FACTOR" | "GROWTH" |
| "FACT_USERS" | "CORPORATE" |

Section 2. Qualities

Table D-2 lists the qualities that need to be determined from the user's answers to the questionnaire.

TABLE D-2

Qualities

| Qual ID | Quality Name | Parent Qual ID | Quality Possible Values |
|---|---|---|---|
| 131 | Corporate Repository (Symbol) |  | YES, NO |
| 116 | Performance (Level) | 109 | 1,2,3,4 |
| 123 | Database Size Scalability (Level) |  | 1,2,3,4 |
| 132 | Flexibility (Level) |  | 1,2,3 |
| 107 | Data Volume (Level) | 106 | 1,2,3,4 |
| 133 | Data Volatility (Level) |  | 1,2,3,4 |
| 100 | Cost (Level) |  | 1,2,3,4 |
| 135 | Implementation Effort (Level) |  | 1,2,3 |
| 105 | System Management (Level) |  | 1,2,3 |

TABLE D-2-continued

Qualities

| Qual ID | Quality Name | Parent Qual ID | Quality Possible Values |
|---|---|---|---|
| 136 | Local Data Views Required (Symbol) |  | YES, NO |

Section 3. Expert System Rules

Here are the rules that will be used to determine the set of required qualities from the answers to the questionnaire.

```
Rule 400
If       [FACT_CORP_RDBMS] = "YES"
Then     [setqual CORPORATE_REPOSITORY] = "YES"
Rule 410
If       [FACT_CORP_RDBMS] in ("NO", "DONT_CARE")
Then     [setqual CORPORATE_REPOSITORY] = "NO"
Rule 420
If       [FACT_ORGANIZATION] in ("CORPORATE", "ENTERPRISE")
and      [FACT_QUERY] = "EXCEPTION"
Then     [setqual FLEXIBILITY] = 2
         [setqual PERFORMANCE] = 2
Rule 430
If       [FACT_ORGANIZATION] in ("CORPORATE", "ENTERPRISE")
and      [FACT_QUERY] in ("TRENDING", "FINANCIAL", "PLANNING")
Then     [setqual FLEXIBILITY] = 3
         [setqual PERFORMANCE] = 3
Rule 440
If       [FACT_ORGANIZATION] in ("WORKGROUP", "BRANCH_OFFICE")
Then     [setqual FLEXIBILITY] = 1
         [setqual PERFORMANCE] = 1
Rule 450
If       [FACT_ORGANIZATION] in ("CORPORATE", "ENTERPRISE")
Then     [setqual LOCAL_DATA_VIEW] = "YES"
Rule 460
If       [FACT_ORGANIZATION] in ("WORKGROUP", "BRANCH_OFFICE")
Then     [setqual LOCAL_DATA_VIEW] = "NO"
Rule 470
If       [FACT_ORGANIZATION] in ("WORKGROUP", "BRANCH_OFFICE")
Then     [setqual DATA_VOLUME] = 1
         [setqual SYSTEM_MANAGEMENT] = 1
         [setqual COST] = 1
Rule 480
If       [FACT_ORGANIZATION] = "ENTERPRISE"
Then     [setqual DATA_VOLUME] = 3
         [setqual SYSTEM_MANAGEMENT] = 3
         [setqual COST] = 3
Rule 490
If       [FACT_ORGANIZATION] = "CORPORATE"
and      [FACT_USERS] = "CORPORATE"
Then     [setqual DATA_VOLUME] = 3
         [setqual SYSTEM_MANAGEMENT] = 2
         [setqual COST] = 2
Rule 500
If       [FACT_ORGANIZATION] = "CORPORATE"
and      [FACT_USERS] = "STAFF"
Then     [setqual DATA_VOLUME] = 3
         [setqual SYSTEM_MANAGEMENT] = 1
         [setqual COST] = 2
Rule 510
If       [FACT_ORGANIZATION] = "CORPORATE"
and      [FACT_QUERY] = "EXCEPTION"
Then     [setqual DATA_VOLUME] = 1
         [setqual SYSTEM_MANAGEMENT] = 1
         [setqual COST] = 1
Rule 520
If       [FACT_SUCCESS_FACTOR] = "GROWTH"
and      [FACT_GROWTH] = "UNLIMITED"
Then     [setqual DATA_SCALEABILITY] = 3
```

-continued

```
Rule 530
If      [FACT_GROWTH] in ("SMALL", "MEDIUM")
Then    [setqual DATA_SCALEABILITY] = 1
Rule 540
If      [FACT_GROWTH] = "LARGE"
Then    [setqual DATA_SCALEABILITY] = 2
Rule 550
If      [FACT_DATA_REFRESH] = "INSTANTLY"
and     [FACT_PERFORMANCE] = "VERY FAST"
Then    [setqual DATA_VOLATILITY] = 4
Rule 560
If      [FACT_DATA_REFRESH] = "INSTANTLY"
and     [FACT_PERFORMANCE] in ("FAST", "SLOW", "MEDIUM")
Then    [setqual DATA_VOLATILITY] = 3
Rule 570
If      [FACT_DATA_REFRESH] = "HOURLY"
Then    [setqual DATA_VOLATILITY] = 2
Rule 580
If      [FACT_DATA_REFRESH] in ("NIGHTLY", "WEEKLY")
Then    [setqual DATA_VOLATILITY] = 1
Rule 590
If      [FACT_PERFORMANCE] in ("MEDIUM", "SLOW")
Then    [setqual EFFORT] = 1
Rule 600
If      [FACT_PERFORMANCE] in ("FAST", "VERY_FAST")
and     [FACT_CAPACITY] in ("SMALL", "MEDIUM")
Then    [setqual EFFORT] = 2
Rule 610
If      [FACT_PERFORMANCE] in ("FAST", "VERY_FAST")
and     [FACT_CAPACITY] = "LARGE"
and     [FACT_ORGANIZATION] in
("WORKGROUP", "CORPORATE", "BRANCH_OFFICE")
Then    [setqual EFFORT] = 3
Rule 620
If      [FACT_PERFORMANCE] in ("FAST", "VERY_FAST")
and     [FACT_CAPACITY] = "UNLIMITED"
Then    [setqual EFFORT] = 4
Rule 630
If      [FACT_SCHEDULE] in ("MONTHS", "HALF_YEAR")
and     [FACT_CAPACITY] in ("LARGE", "UNLIMITED")
and     [FACT_ORGANIZATION] = "ENTERPRISE"
Then    [setqual EFFORT] = 4
        [setqual COST] = 4
```

Section 4. List of Required Qualities Determined by Expert System

Table D-3 lists the required qualities derived by the expert system from the fact list using the above listed rules. In this example, the quality weights have been assigned based on system default weights.

TABLE D-3

Sample Required Qualities

| Quality | Quality Value | Quality Weights |
|---|---|---|
| CORPORATE REPOSITORY | NO | 1 |
| FLEXIBILITY | 3 | 10 |
| PERFORMANCE | 3 | 40 |
| DATA VOLATILITY | 2 | 1 |
| IMPLEMENTATION EFFORT | 4 | 1 |
| COST | 4 | 80 |
| LOCAL DATA VIEWS REQUIRED | YES | 1 |
| DATABASE VOLUME | 3 | 1 |
| DATABASE SIZE SCALEABILITY | 1 | 10 |
| SYSTEM MANAGEMENT | 3 | 10 |

I claim:

1. A quality driven expert system, executable on a computer system including a processor, the system comprising:

a user questionnaire module that presents a plurality of questions to a user and receives a plurality of answers;

an expert system module that maps the answers into a set of qualities to determine a set of required qualities, each required quality having a first quality value derived from at least one answer;

a database of output entities, each output entity defined by selected ones of the qualities, each selected quality of an output entity having a second quality value; and a matching algorithm module that receives the required qualities from the expert system and compares the first quality values of the required qualities to the second quality values of selected ones of the qualities of the output entities to determine a ranked set of output entities that satisfy the required qualities.

2. The expert system of claim 1, wherein:

the matching algorithm module outputs for each selected output entity a score as a function of whether the second quality values of the selected ones of the qualities satisfy the first quality values of the required qualities.

3. The expert system of claim 2, wherein:

each required quality has a quality operator; and the score of an output entity is determined by whether for each required quality, the each second quality value of a corresponding selected quality of the output entity satisfies the quality operator and first quality value of the required quality.

4. The expert system of claim 2, wherein:

a at least one required quality has a quality weight derived from the user's answers; and the score of each output entity is a function of the weight of at least one required quality.

5. The expert system of claim 1, wherein the qualities are orthogonal.

6. The expert system of claim 1, wherein at least one quality is hierarchically defined by at least two other qualities.

7. The expert system of claim 1, wherein the expert system includes at least one rule including an antecedent defining a value of a fact, and a consequent defining a value to be assigned to a quality.

8. A computer mediated process of selecting a network architecture for a computer network, comprising:

presenting a plurality of questions to a user regarding the user's requirements for the computer network;

receiving from the user answers to the questions;

deriving from the user's answers a set of required qualities for the network architecture, each required quality having a requird quality value;

providing a plurality of network architectures, each network architecture defined by selected ones of the set of qualities, each of the selected ones of the qualities having a defined quality value; and selecting at least one network architecture by comparing the required values of the required qualities to the defined values of the qualities of a network architecture.

9. The method of claim 8, further comprising:

providing a selection explanation of each selected network to the user, the selection explanation describing for each required quality the degree to which the selected network architecture satisifies the required quality.

10. The method of claim 8, further comprising:

wherein selecting at least one network architecture by comparing the required values of the required qualities to the defined values of the qualities of a network architecture, comprises:

selecting at least one network architecture as a function of a difference between the required values of the required qualities and defined values of the qualities of the network architecture.

11. The method of claim 10, further comprising:

determining for at least one required quality a weight of the required quality; and wherein the difference between a required value of a required quality and a defined value is weighted by the weight of the required quality.

12. The method of claim 8 wherein the qualities are orthogonal.

13. The method of claim 8 wherein at least one quality is hierarchically defined by at least two other qualities.

14. A quality driven expert system for selecting a network architecture, executable on a computer system including a processor, the system comprising:

a database of network architectures, each defined by selected ones of a set of qualities, each selected quality of an network architecture having a defined quality value;

a user questionnaire module that presents a plurality of questions to a user and receives a plurality of answers;

an expert system module that receives the answers from the user questionnaire module and derives from the answers a set of required qualities, each required quality having a required quality value;

a matching algorithm module, coupled to the database, that receives the required qualities from the expert system and determines a score for at least one network architecture from the database by determining for each required quality, whether the defined quality value of a quality of the network architecture corresponding to the required quality satisfies the quality value of the required quality, matching algorithm module ranking the network architectures by their scores.

15. The expert system of claim 14, wherein the matching algorithm produces for each network architecture that is scored a selection explanation, the selection explanation indicating for each required quality the degree to which the required quality was satisified by a corresponding quality of the network architecture.

* * * * *